(12) United States Patent
Arango et al.

(10) Patent No.: US 12,386,805 B1
(45) Date of Patent: Aug. 12, 2025

(54) AGGREGATED PROFILE FOR CONTENT RECOMMENDATION

(71) Applicant: Amazon Technologies, Inc., Seattle, WA (US)

(72) Inventors: Allen Robert Arango, New York, NY (US); Manoj Khanwalkar, Princeton Junction, NJ (US); Mohsin Khan, Pickering (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/368,191

(22) Filed: Sep. 14, 2023

(51) Int. Cl.
*G06F 16/22* (2019.01)

(52) U.S. Cl.
CPC .............................. *G06F 16/2228* (2019.01)

(58) Field of Classification Search
CPC .................................................. G06F 16/2228
USPC ........................................................ 707/738
See application file for complete search history.

(56) References Cited

U.S. PATENT DOCUMENTS

| | | | |
|---|---|---|---|
| 10,290,039 B2* | 5/2019 | Hueter | G06Q 30/0269 |
| 10,643,246 B1* | 5/2020 | Suprasadachandran Pillai | G06Q 30/0269 |
| 2010/0211636 A1* | 8/2010 | Starkenburg | H04N 21/43615 709/224 |
| 2011/0069940 A1* | 3/2011 | Shimy | H04N 21/4532 386/296 |
| 2012/0078725 A1* | 3/2012 | Maitra | G06Q 30/0269 705/14.66 |
| 2012/0197967 A1* | 8/2012 | Sivavakeesar | G06Q 50/01 709/203 |
| 2013/0304731 A1* | 11/2013 | Zheng | G06Q 30/0282 707/728 |
| 2015/0235258 A1* | 8/2015 | Shah | G06Q 30/0242 705/14.45 |
| 2016/0260112 A1* | 9/2016 | Irving | G06Q 10/0637 |
| 2016/0323398 A1* | 11/2016 | Guo | H04L 67/535 |
| 2017/0124595 A1* | 5/2017 | Costache | H04L 67/306 |
| 2019/0205288 A1* | 7/2019 | Faith | G06Q 30/06 |
| 2022/0398340 A1* | 12/2022 | Jakobsson | G06F 21/602 |

* cited by examiner

*Primary Examiner* — Cam Linh T Nguyen
(74) *Attorney, Agent, or Firm* — Kilpatrick Townsend & Stockton LLP

(57) ABSTRACT

A method for providing access to an aggregated profile can include receiving data from data sources. The data can include one or more identification indicators for target entities. Each identification indicator can be mapped to one or more entities of the target entities. Historical interactions that may be associated with the target entities can be identified based at least in part on the mapping. A particular target entity of the target entities can be identified based at least in part on the mapping and the one or more historical interactions. An aggregated profile can be generated for the particular target entity based at least in part on the mappings and the one or more historical interactions. Access can be provided to the aggregated profile.

20 Claims, 12 Drawing Sheets

AGGREGATED PROFILE FOR CONTENT RECOMMENDATION

BACKGROUND

Provider entities, such as entities that provide online computing services, receive many interactions from many different sources. For example, a user entity may log into an account associated with a provider entity, may simply request a service provided by the user entity, and the like. Different types of interactions, different scales of interactions, and the like that are associated with the provider entities can occur. Among the different types of interactions, the different scales of interactions, and the like, it can be technically challenging to track a particular entity and to provide quality content recommendations.

BRIEF DESCRIPTION OF THE DRAWINGS

Various embodiments in accordance with the present disclosure will be described with reference to the drawings, in which.

DETAILED DESCRIPTION

Figure 1:
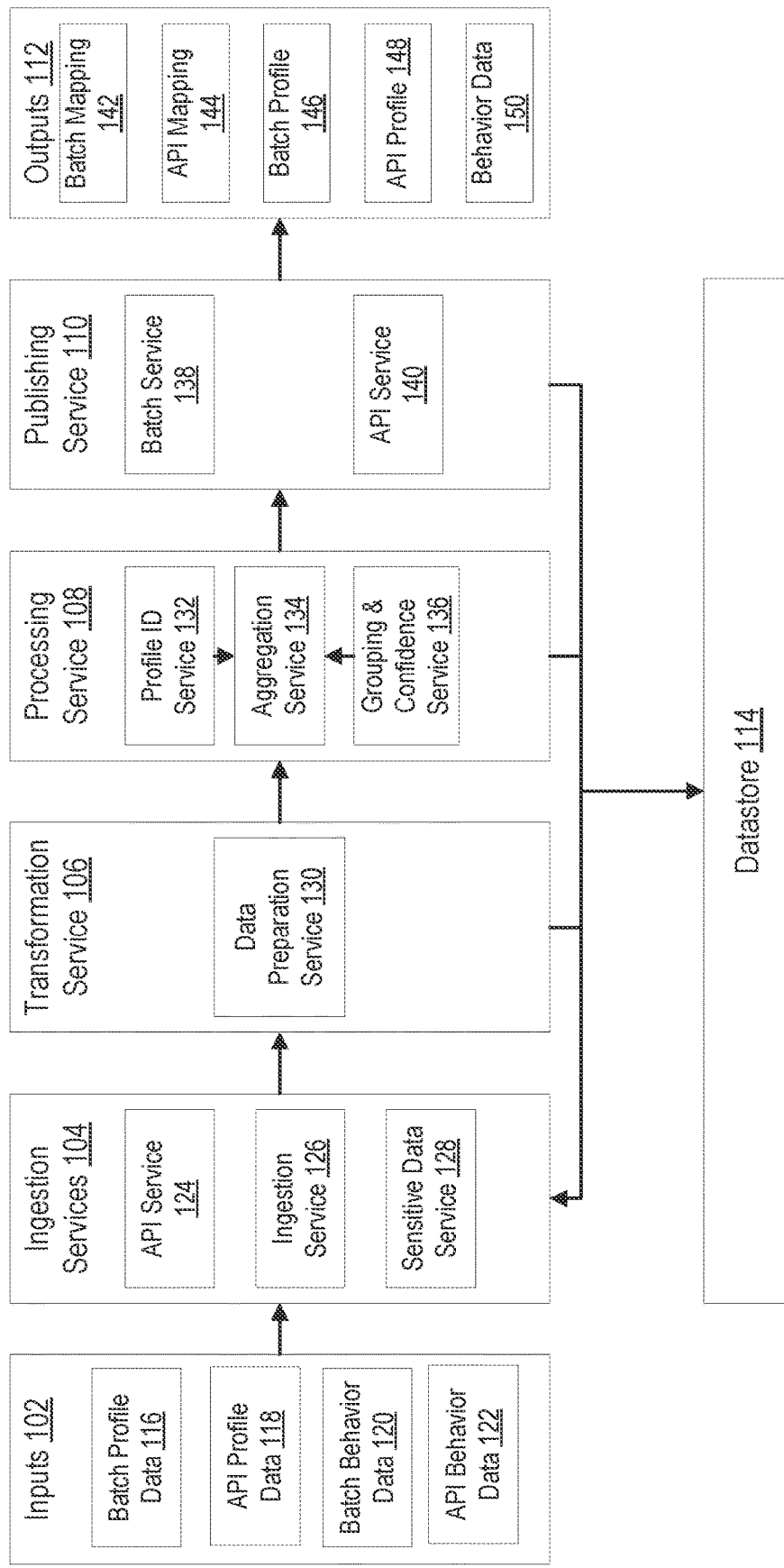
FIG. 1 illustrates an example of a computing environment in which a profile identification service and/or an aggregation service can be used to provide access to an aggregated profile in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain aspects and features of the present disclosure relate to an aggregated profile for a target entity. The target entity may be or include a user of a computing device, a user of online computing resources or services, etc. The aggregated profile can be generated, for example in response to receiving appropriate permissions, for the target entity using a profile identification service, an aggregation service, other suitable services and/or machine-learning models, and the like. The aggregated profile may provide insights, additional information, previously unknown information, and the like about the target entity. In some embodiments, the aggregated profile may associate previous or historical interactions in which the target entity was involved with one or more identification indicators of the target entity. For example, the aggregated profile may include data, or indications of data, from one or more different data sources, which may be disjunctive with respect to one another, which may not be configured to communicate with one another, and/or which may store data in different configurations, etc., such that the data may be associated with the one or more identification indicators, the previous or historical interactions, or a combination thereof. The aggregated profile can be provided for use by one or more provider entities such as an entity that provides online computing resources or services, etc. The aggregated profile can be provided to facilitate content recommendations to the target entity, to facilitate personalized online computing resources or personalized online computing experiences for the target entity, and the like. In some examples, access to the aggregated profile can be provided. Additionally or alternatively, a computing device that includes and/or uses the profile identification service and/or the aggregation service may automatically, for example in response to generating, adjusting, and/or receiving the aggregated profile, provide one or more content recommendations for the target entity.

In a particular example, a target entity may access an interactive computing environment provided by a provider entity. The interactive computing environment may be provided by the provider entity via a computing service, which may include a computing device, a computer server, a server farm, or the like. The computing service may receive data regarding the target entity based at least in part on a request to access the interactive computing environment, etc. For example, the computing service may receive identification data from a login attempt by the target entity. In other examples, the target entity may not provide login or authentication information and may simply access the interactive computing environment. The computing service may use the received data to receive an existing profile associated with the target entity. The existing profile may include identification indicators for the target entity, indications of historical interactions involving the target entity, and the like. The computing service may augment the existing profile with the received data, or, in examples in which the computing service does not receive the existing profile, the computing service may generate an initial profile for the target entity. In some examples, the computing service may identify more than one existing profile for the target entity, for example based on the identification indicators received for the target entity. The computing service may aggregate the more than one existing profile, may augment the received data with the existing profile, and the like to generate an aggregated profile for the target entity. The computing service may use the aggregated profile to recommend content to the target entity. For example, the computing service may adjust the interactive computing environment based on the aggregated profile, may display one or more offers for the target entity on the interactive computing environment based on the aggregated profile, and the like. Additionally or alternatively, the computing service may provide access to the aggregated profile. For example, the computing service may transmit the aggregated profile to a separate computing service that can use the aggregated profile as an input, can store the aggregated profile in a data repository that may be accessible to one or more separate computing devices or services, and the like.

Techniques described herein include providing one or more content recommendations for a particular target entity based at least in part on an aggregated profile associated with the particular target entity. A computing device can receive data from a set of data sources. The data received by the computing device may include a set of identification indicators for one or more target entities. In some examples, an identification indicator may be or include personally identifiable information such as a name, a Social Security number, a physical address, a digital address, a date of birth, a biometric indicator, and the like. The personally identifiable information may be collected, stored, used, and the like in response to receiving appropriate permissions. The computing device can include, access, or otherwise execute a profile identification service. The profile identification service can generate a set of mappings using the data. Each mapping of the set of mappings may associate a different identification indicator of the set of identification indicators with one or more entities of the one or more target entities. The profile identification service can identify a set of subsequent identification indicators for the one or more target entities based at least in part on the set of mappings. The set of subsequent identification indicators may represent a set of historical interactions associated with the one or more target entities. The profile identification service may identify the particular target entity among the one or more target entities based at least in part on the set of mappings and the set of subsequent identification indicators. The profile identification service, or in other examples, an aggregation service included in the computing device, can generate the aggregated profile for the particular target entity based at least in part on the set of mappings and the set of subsequent identification indicators. The computing device can provide one or more content recommendations for the particular target entity based at least in part on the aggregated profile.

FIG. 1 illustrates an example of a computing environment 100 in which a profile identification service and/or an aggregation service can be used to provide access to an aggregated profile in accordance with at least one embodiment. As illustrated in FIG. 1, the computing environment 100 can include inputs 102, ingestion services 104, a transformation service 106, a processing service 108, a publishing service 110, outputs 112, and a datastore 114. The computing environment 100 may include additional or alternative components, services, and the like in which a profile identification service and/or an aggregation service can be used to provide access to an aggregated profile. The inputs 102 can include batch profile data 116, application programming interface (API) profile data 118, batch behavior data 120, and API behavior data 122, though any suitable additional or alternative types or numbers of inputs may be included in the inputs 102. In some embodiments, the inputs 102 can be received by a first computing device associated with a provider entity from a second computing device associated with a client entity, a user entity, a target entity, or the like. In other embodiments, the inputs 102 may be accessed by the first computing device for example by the first computing device making one or more API calls to one or more separate computing devices to receive the inputs 102. The batch profile data 116 may be or include historical or existing profiles for one or more target entities, one or more identification indicators for the one or more target entities, and the like. The batch profile data 116 may include data from separate data sources, which may be disjunctive, or otherwise not in communication, with respect to one another. In some embodiments, the batch profile data 116 may include data recorded based on previous or historical interactions involving the one or more target entities. The API profile data 118 may be or include historical or existing profiles for the one or more target entities. The API profile data 118 may include historical API calls previously made and associated with the one or more target entities. Additionally or alternatively, the API profile data 118 may indicate or represent historical interactions involving the one or more target entities. The batch behavior data 120 and/or the API behavior data 122 may include indications of behavior for the one or more target entities. For example, the batch behavior data 120 and/or the API behavior data 122 may include one or more characterizations or one or more inferences regarding a behavior of the one or more target entities based on historical interaction data, etc. The inputs 102 can be received by the first computing device and may be ingested for use using the ingestion services 104.

The ingestion services 104 may ingest the inputs 102, such as via a stream of data, and may cause the first computing device to process the inputs 102 or to otherwise execute one or more algorithms, one or more machine-learning models, and the like for generating the outputs 112. The ingestion services 104 may include an API service 124, an ingestion service 126, and a sensitive data service 128, though the ingestion services 104 may include any suitable additional or alternative services, components, and the like for providing ingestion functionality for the first computing device. The API service 124 may be configured to make and/or receive one or more API calls to receive the inputs 102. For example, the API service 124 may receive an API call from the second computing device to receive the inputs 102 transmitted by the second computing device. In another example, the API service 124 may make an API call to a separate computing device, which may include the second computing device or another suitable computing device, to access and request one or more of the inputs 102. In some embodiments, the API service 124 can include or execute multiple APIs or API calls such as API calls to retrieve mappings, to update mappings in real-time, to generate an initial profile, and the like. Additionally or alternatively, GraphQL, for example available from Meta®, may be used to implement the API service 124 and/or any other API or API service described herein. In some embodiments, the API service 124, and/or any other API or API service described herein, may be or include RESTful APIs. Additionally or alternatively, the API service 124, and/or any other API or API service described herein may include a tagging API that can facilitate collection of data from disjunctive or disparate sources and ingestion into the computing environment 100 and/or any component or service included therein. The API service 124 may make one or more API calls to a set of computing devices or data repositories that store data in different locations, different configurations, and the like to ensure that the inputs 102 include an adequate breadth of data regarding the one or more target entities. The ingestion service 126 may be configured to ingest the data received by the API service 124 into the first computing device. For example, the ingestion service 126 may be communicatively coupled with the API service 124 and may receive the inputs 102 from the API service 124 to be ingested into the first computing device. The sensitive data service 128 may be configured to ingest or otherwise manage sensitive data received via the inputs 102. For example, at least a subset of the inputs 102 may include personally identifiable information, protected information, and the like. In some embodiments, the sensitive data service 128 may encrypt or otherwise protect the sensitive data from unauthorized disclosure.

The transformation service 106 may transform the ingested data into a configuration that can be used by the first computing device to generate and/or provide the aggregated profile for the particular target entity. For example, the transformation service 106 may validate, clean, transform, and the like the ingested data. The ingested data may be or included unstructured data that the transformation service 106 can clean, validate, transform, and the like. In some embodiments, the transformation service 106 may include a data preparation service 130 and/or any other suitable service, machine-learning model, and the like for preparing the ingested data. The data preparation service 130 may be or include a computer algorithm, a machine-learning model, or the like that may be configured to receive the ingested data, for example from the ingestion services 104 and output transformed data that can be used by the first computing device. In a particular example, the data preparation service 130 may convert a file format of the ingested data into a format compatible with one or more services or models that can be executed by the first computing device. In another example, the data preparation service 130 can organize the inputs 102 into prepared data that can be used by the one or more services or models that can be executed by the first computing device. The data preparation service 130, or the transformation service 106, may be communicatively coupled with the processing service 108, and the prepared data can be transmitted by the data preparation service 130, or the transformation service 106, to the processing service 108.

The processing service 108 may receive the prepared data and may perform one or more operations, for example via one or more services or sub-services included in the processing service 108, to generate the aggregated profile for the particular target entity. In some embodiments, the processing service 108 may include a profile identification service 132, an aggregation service 134, a grouping and confidence service 136, and/or any other suitable service or sub-service that can provide functionality to the processing service 108. The profile identification service 132 can receive the prepared data and can identify one or more identification indicators for one or more target entities, can identify one or more historical interactions and/or one or more subsequent historical interactions associated with the one or more target entities, can identify one or more existing profiles of the one or more target entities, can generate mappings based on the foregoing, and the like. In a particular example, the profile identification service 132 can use the prepared data to generate mappings between target entities and one or more identification indicators of the prepared data. The profile identification service 132 can identify a particular target entity using the one or more identification indicators, the mappings, and the like and can identify one or more historical interactions with which the particular target entity is associated based at least in part on the identification indicators of the prepared data. In some embodiments, the profile identification service 132 can use the one or more identification indicators to identify one or more existing profiles for the particular target entity. In some embodiments, the profile identification service 132 can generate a graph of the mappings, for example for a particular target entity, maintain and update the graph, maintain metadata to track relationships of existing profiles or an initial profile of the particular target entity, confidence levels for the foregoing and for mappings, and the like.

The aggregation service 134 may be configured to generate the aggregated profile based at least in part on an output provided by the profile identification service 132. For example, the aggregation service 134 may aggregate two or more existing profiles for the particular target entity to generate the aggregated profile based at least in part on mappings provided by the profile identification service 132. In another example, the aggregation service 134 may aggregate an initial profile generated for a previously unknown entity and an existing profile for the particular target entity in response to the profile identification service 132 determining that the initial profile is associated with the particular target entity. In some embodiments, the profile identification service 132 and the aggregation service 134 may be the same service or may be combined into a single service with the functionalities of the profile identification service 132 and the aggregation service 134. The grouping and confidence service 136 may be configured to determine one or more likelihoods for the aggregated profile and based on the prepared data and/or the output from the profile identification service 132 and/or the aggregation service 134.

In some embodiments, the grouping and confidence service 136 may be, may include, or may be configured to execute one or more machine-learning models to determine the one or more likelihoods. The one or more machine-learning models may receive the prepared data, the output from the profile identification service 132, and/or the output from the aggregation service 134 to determine the one or more likelihoods. In some embodiments, the one or more machine-learning models may be configured to map the inputs into the one or more machine-learning models to outputs that include the one or more likelihoods. The one or more likelihoods may indicate a likelihood of the particular target entity initiating an interaction at a future time, may indicate a likelihood that the particular target entity initiated or was otherwise involved in a historical interaction, may indicate a likelihood that an existing profile is associated with the particular target entity, and the like. In some embodiments, the grouping and confidence service 136 may group existing profiles, initial profiles, etc. into segments based at least in part on aggregated data attributes, behavior data, geolocation data, historical interaction data, digital address data, and the like. The grouping and confidence service 136 can leverage machine-learning rules, manual rules, and the like to group target entities into the segments. The grouping and confidence service 136 can use clustering models, such as k-means, density-based spatial clustering of applications with noise, Gaussian mixture model, and the like, can be used. Additionally or alternatively, the grouping and confidence service 136 can perform its functionalities with respect to authenticated entities and/or unauthenticated entities. The grouping and confidence service 136 can augment the aggregated profile with the one or more likelihoods, and the processing service 108 can transmit the aggregated profile to the publishing service 110, which may be communicatively coupled with the processing service 108.

The publishing service 110 may receive the aggregated profile for the particular target entity, along with any additional suitable data relating to the particular target entity, and may be configured to provide access to the aggregated profile. In some embodiments, the publishing service 110 may include a batch service 138, and an API service 140, which may be similar or identical to the API service 124, and any other suitable services, sub-services, components, and the like for providing functionality for the publishing service 110. The batch service 138 and/or the API service 140 may be configured to package the aggregated profile in such a way that can be consumed by a separate computing device. For example, the batch service 138 may access the aggregated profile to generate batch mapping 142, batch profile 146, and batch behavior 150. Additionally or alternatively, the API service 140 may access the aggregated profile to generate API mapping 144 and API profile 148. The batch mapping 142 and/or the API mapping 144 may include mappings that associate identification indicators and target entities. Additionally or alternatively, the batch mapping 142 and/or the API mapping 144 may include mappings that associate historical interactions and the target entities. The batch profile 146 and/or the API profile 148 may include profiles associated with the particular target entity and may include the aggregated profile for the particular entity. The batch behavior 150 may include an indication of one or more behavior types for the particular target entity. In a particular example, the batch behavior 150 may include the one or more likelihoods generated by the one or more machine-learning models.

In some embodiments, the ingestion services 104, the transformation service 106, the processing service 108, and/or the publishing service 110 may be communicatively coupled with the datastore 114. The datastore 114 may be or include one or more separate data repositories that may store data relevant to the aggregated profile or relevant to generating the aggregated profile. For example, the datastore 114 may store historical interaction data, existing profiles for one or more of the target entities, identification indicators, and the like. The ingestion services 104, the transformation service 106, the processing service 108, and/or the publishing service 110 may each or in any sub-combination access the datastore 114 to receive data to ingest the inputs 102, to prepare the ingested data, to process the prepared data, to publish the aggregated profile, and the like.

The outputs 112 may include the batch mapping 142, the API mapping 144, the batch profile 146, the API profile 148, the batch behavior 150, and/or any other suitable outputs to be included in the outputs 112. In some embodiments, the outputs 112 may include the aggregated profile that may be stored or otherwise accessible in a configuration that one or more separate computing devices or computing services can access and/or ingest the aggregated profile. For example, the first computing device may store the outputs 112 in a data repository that is accessible to one or more other computing devices. In another example, the first computing device may transmit the aggregated profile to one or more separate computing devices to facilitate content recommendations for the particular target entity made by the one or more separate computing devices. In yet another example, the first computing device may ingest the outputs 112 in a separate computing service, machine-learning model, and the like to generate and/or provide the content recommendations for the particular target entity.

Figure 2:
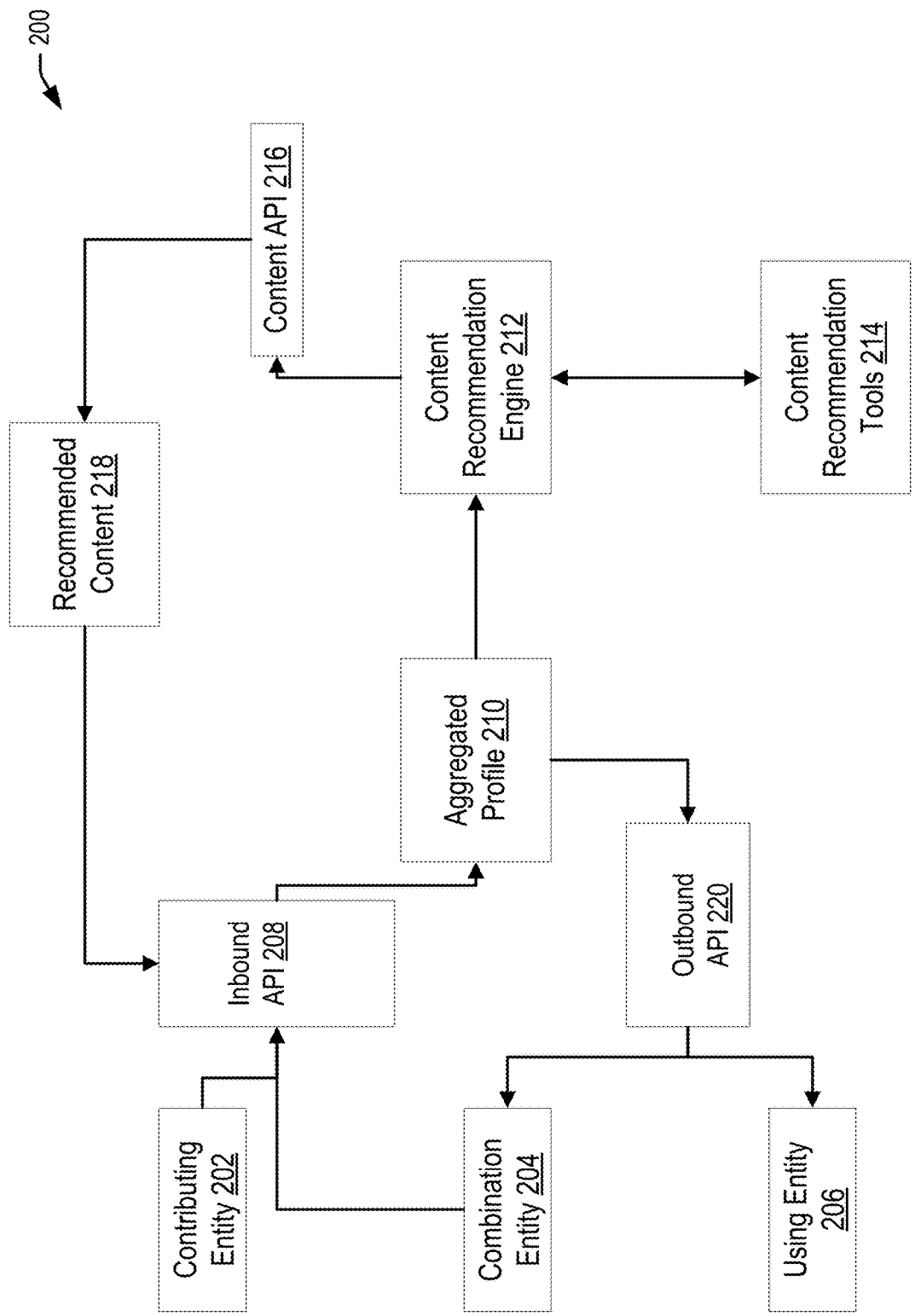
FIG. 2 illustrates an example of a data flow diagram of data for providing a content recommendation based at least in part on an aggregated profile in accordance with at least one embodiment.

FIG. 2 illustrates an example of a data flow diagram 200 of data for providing a content recommendation based at least in part on an aggregated profile in accordance with at least one embodiment. The data flow diagram 200 may begin with a contributing entity 202, a combination entity 204, and/or a using entity 206. In some embodiments, the contributing entity 202 may be a provider entity that may provide goods and/or services, the using entity 206 may be or include a user of goods and/or services provided by the provider entity, and the combination entity 204 may be or include an entity that provides good and/or services and that uses separate goods and/or services. The contributing entity 202 and/or the combination entity 204 may interact with an inbound API 208. For example, the contributing entity 202 and/or the combination entity 204 may access an online computing environment provided by an online resource provider entity. The contributing entity 202 and/or the combination entity 204 may request access, such as by providing authentication data, by attempting to login to the interactive computing environment, etc., to the interactive computing environment, may request online computing resources, may use a computing device to access a webpage, etc. By the foregoing, the inbound API 208 may gather data, or cause data to be gathered, regarding the contributing entity 202 and/or the combination entity 204. For example, the inbound API 208 may gather, or cause to be gathered, identification indicators, device identifications, and the like associated with the contributing entity 202 and/or the combination entity 204, historical interaction data associated with the contributing entity 202 and/or the combination entity 204, and the like. The inbound API 208 may share the gathered data, or may cause the gathered data to be shared, with a computing device that includes a profile identification service, such as the profile identification service 132, and/or an aggregation service such as the aggregation service 134. The computing device can execute the profile identification service and/or the aggregation service to identify existing profiles for the contributing entity 202 and/or the combination entity 204, to generate initial profiles for the contributing entity 202 and/or the combination entity 204, or to otherwise generate an aggregated profile 210 for the contributing entity 202 and/or the combination entity 204.

The aggregated profile 210 may be transmitted, for example by the computing device, to a content recommendation engine 212. The content recommendation engine 212 may be configured to receive the aggregated profile 210 and to output recommended content such as recommended content 218. In some embodiments, the recommended content 218 may be or include a recommendation for the target entity, such as, in this case, the contributing entity 202 and/or the combination entity 204, to acquire additional computing resources, to use additional computing resources provided by the online resource provider entity, or the like. The content recommendation engine 212 may be communicatively coupled with content recommendation tools 214, which may facilitate content recommendation by the content recommendation engine 212. For example, the content recommendation engine 212 may access the content recommendation tools 214 and may generate the recommended content 218 using the content recommendation tools 214. In some embodiments, the content recommendation tools 214 may include advertisement tools that can be used to recommend content to the contributing entity 202, the combination entity 204, and/or the using entity 206.

The content recommendation engine 212 can transmit the recommended content 218 to the aggregated profile 210 via a content API 216. For example, the content recommendation engine 212 can make an API call to the aggregated profile 210 via the content API 216. The API call to the aggregated profile 210 may cause the aggregated profile 210 to be augmented with, or otherwise adjusted with, the recommended content 218. In a particular example, if the recommended content 218 includes an indication to recommend additional computing resources to the contributing entity 202 and/or the combination entity 204, then the API call via the content API 216 may cause the aggregated profile 210 to include the indication to recommend additional computing resources to the contributing entity 202 and/or the combination entity 204.

The aggregated profile 210 may additionally or alternatively make an API call to the combination entity 204 and/or the using entity 206. For example, the aggregated profile 210 may make the API call via an outbound API 220. The outbound API 220 may be configured to facilitate communication between the aggregated profile 210 and the combination entity 204 and/or the using entity 206. In some embodiments, the aggregated profile 210 may use the outbound API 220 to provide the recommended content 218 to the combination entity 204 and/or the using entity 206, may use the outbound API 220 to gather data about one or more interactions between the contributing entity 202, the combination entity 204, and/or the using entity 206, and the like.

Figure 3:
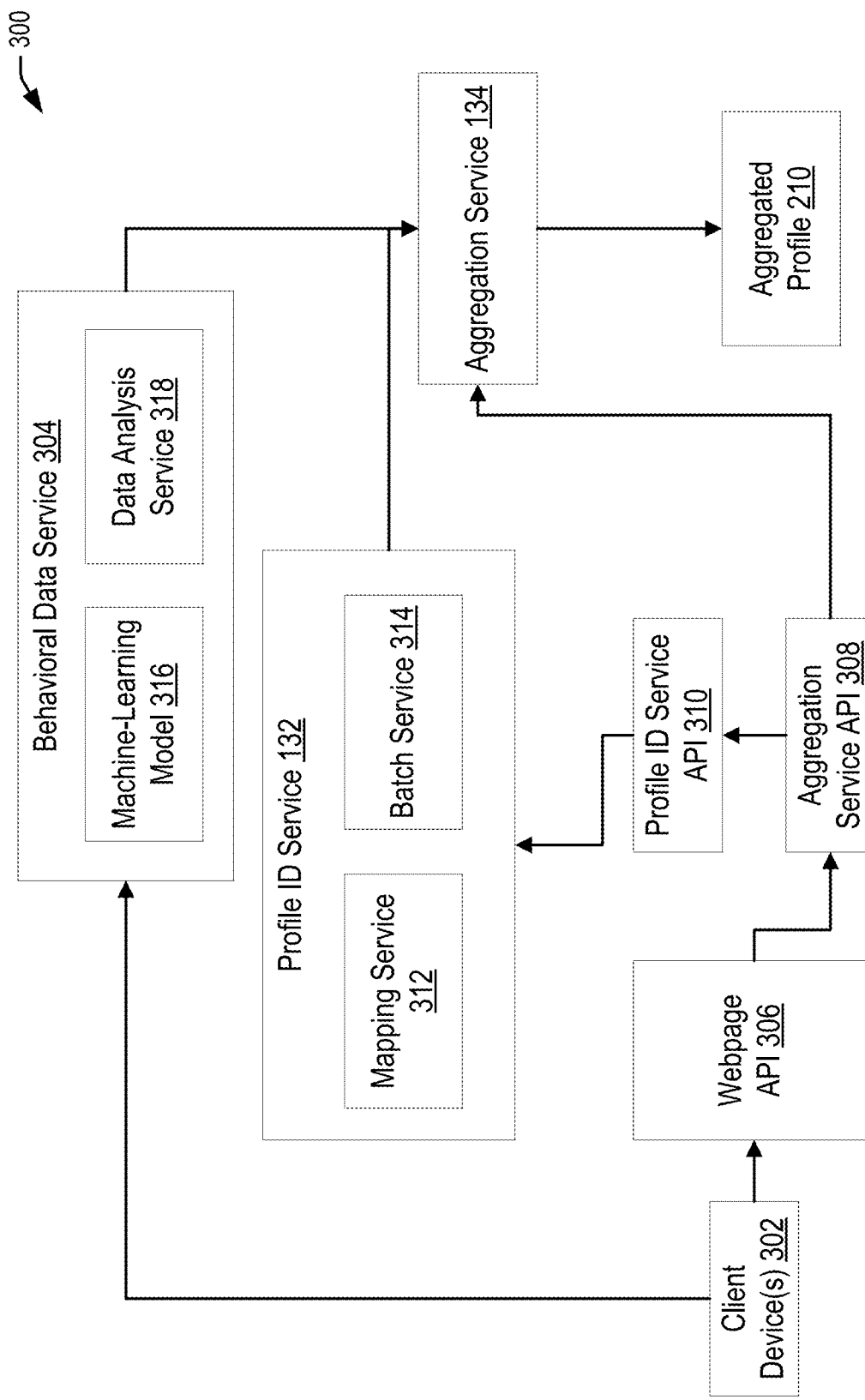
FIG. 3 illustrates an example of a computing environment in which an aggregated profile for an entity can be generated in accordance with at least one embodiment.

FIG. 3 illustrates an example of a computing environment 300 in which an aggregated profile, such as the aggregated profile 210, for an entity can be generated in accordance with at least one embodiment. The computing environment 300 may include a client device 302, the profile identification service 132, a behavioral data service 304, the aggregation service 134, and/or any other suitable service that can facilitate generation of the aggregated profile 210. The client device 302 can be or include one or more computing devices that can be used by a particular target entity to access an interactive computing environment, which may be provided by a provider of online computing resources. In some embodiments, the provider of online computing resources may own, manage, or otherwise control the profile identification service 132, the behavioral data service 304, the aggregation service 134, and the like. The client device 302 can transmit a request to access the interactive computing environment via an API call. For example, the client device 302 can transmit the API call via webpage API 306, which may be configured to facilitate access of the client device 302 to a webpage through which the interactive computing environment is provided. In some examples, the webpage API 306 may gather, or cause to be gathered, data relating to the client device 302, to the particular target entity associated with the client device 302, or the like. The webpage API 306 may provide, or cause to be provided, the gathered data to the provider of online computing resources or to a computing device or service associated therewith that may host or execute the profile identification service 132, a behavioral data service 304, and/or the aggregation service 134.

In some embodiments, the gathered data may be transmitted to the profile identification service 132, to the aggregation service 134, or to a combination thereof. A first API call, for example via an aggregation service API 308, can be made to transmit the gathered data, or any subset thereof, to the aggregation service 134 and/or to a profile identification service API 310. Additionally or alternatively, a second API call, for example via the profile identification service API 310, can be made to transmit the gathered data, or any subset thereof, to the profile identification service 132. The profile identification service 132 can receive the gathered data and can perform one or more mapping operations, one or more batch operations, and/or any other suitable type of operation with respect to the gathered data. For example, and as illustrated in FIG. 3, the profile identification service 132 can include a mapping service 312, a batch service 314, which may be similar or identical to the batch service 138, and any other suitable services for providing functionality for the profile identification service 132. The mapping service 312 may generate one or more mappings based at least in part on the gathered data. For example, the profile identification service 132 may execute the mapping service 312 to generate a set of mappings between identification indicators included in the gathered data and one or more target entities. Additionally or alternatively, the mapping service 312 may map one or more subsequent identification indicators, such as identification indicators from historical interaction data, etc., to the one or more entities. In some embodiments, the mappings generated by the mapping service 312 may not be characterized by a one-to-one correspondence. For example, a particular identification indicator or a particular subsequent identification indicator may be mapped to more than one entity, and/or more than one identification indicator or more than one subsequent identification indicator may be mapped to a particular entity. Additionally or alternatively, the profile identification service 132 may execute the batch service 314 to publish the mappings or to otherwise provide access, for example to other services or components of the computing environment 300, to the mappings. For example, the profile identification service 132 may execute the batch service 314 to transmit the mappings output by the mapping service 312 to the aggregation service 134.

In some embodiments, the behavioral data service 304 may receive the gathered data and/or additional data from the client device 302, from the webpage API 306, or from other suitable sources. For example, the behavioral data service 304 may be communicatively coupled with the interactive computing environment, or a computing device of the provider of online computing resources, etc. The behavioral data service 304 may provide behavioral indications for the particular target entity or other insights that can be used to enrich the aggregated profile 210. The behavioral data service 304 may receive the gathered data, additional data, and the like and may input the data received into a machine-learning model 316, a data analysis service 318, and/or any other suitable model or service for analyzing the behavior of the particular target entity. In some embodiments, the machine-learning model 316 may be configured to receive the gathered data and/or any additional data regarding the access attempt by the particular target entity (or the target entity itself) and to output one or more likelihoods relating to the particular target entity. The one or more likelihoods may indicate a likelihood that the particular target entity is associated with one or more existing profiles, may indicate a behavior of the particular target entity based on historical interaction data, and the like. In some embodiments, the behavioral data service 304 may use the output from the machine-learning model 316, the gathered data, the additional data, or any combination thereof as inputs to the data analysis service 318. The behavioral data service 304 may execute the data analysis service 318 to determine whether the particular target entity is associated with one or more existing profiles. For example, the data analysis service 318 can use the likelihoods output by the machine-learning model 316, the identification indicators of the gathered data, and the like to determine whether the particular target entity is associated with the one or more existing profiles. The behavior data service 304 can output the determination, which may be or include one or more mappings, to the aggregation service 134.

The aggregation service 134 can receive the mappings from the profile identification service 132, the mappings from the behavioral data service 304, and any other suitable data that can be used for generating the aggregated profile 210. In some embodiments, the aggregation service 134 may receive one or more existing profiles, or indications thereof, from the profile identification service 132 and/or the behavioral data service 304. The one or more existing profiles may have been identified by the profile identification service 132 and/or the behavioral data service 304 as being associated with the particular target entity. The aggregation service 134 can receive the mappings as input and can access and/or receive the one or more existing profiles, an initial profile, or the like for the particular entity and can aggregate the one or more existing profiles and/or the initial profile for the particular target entity to generate the aggregated profile 210. The aggregation service 134 can output the aggregated profile 210 to a separate computing device or computing service, or can otherwise provide access to a separate computing device or computing service to the aggregated profile 210.

Figure 4:
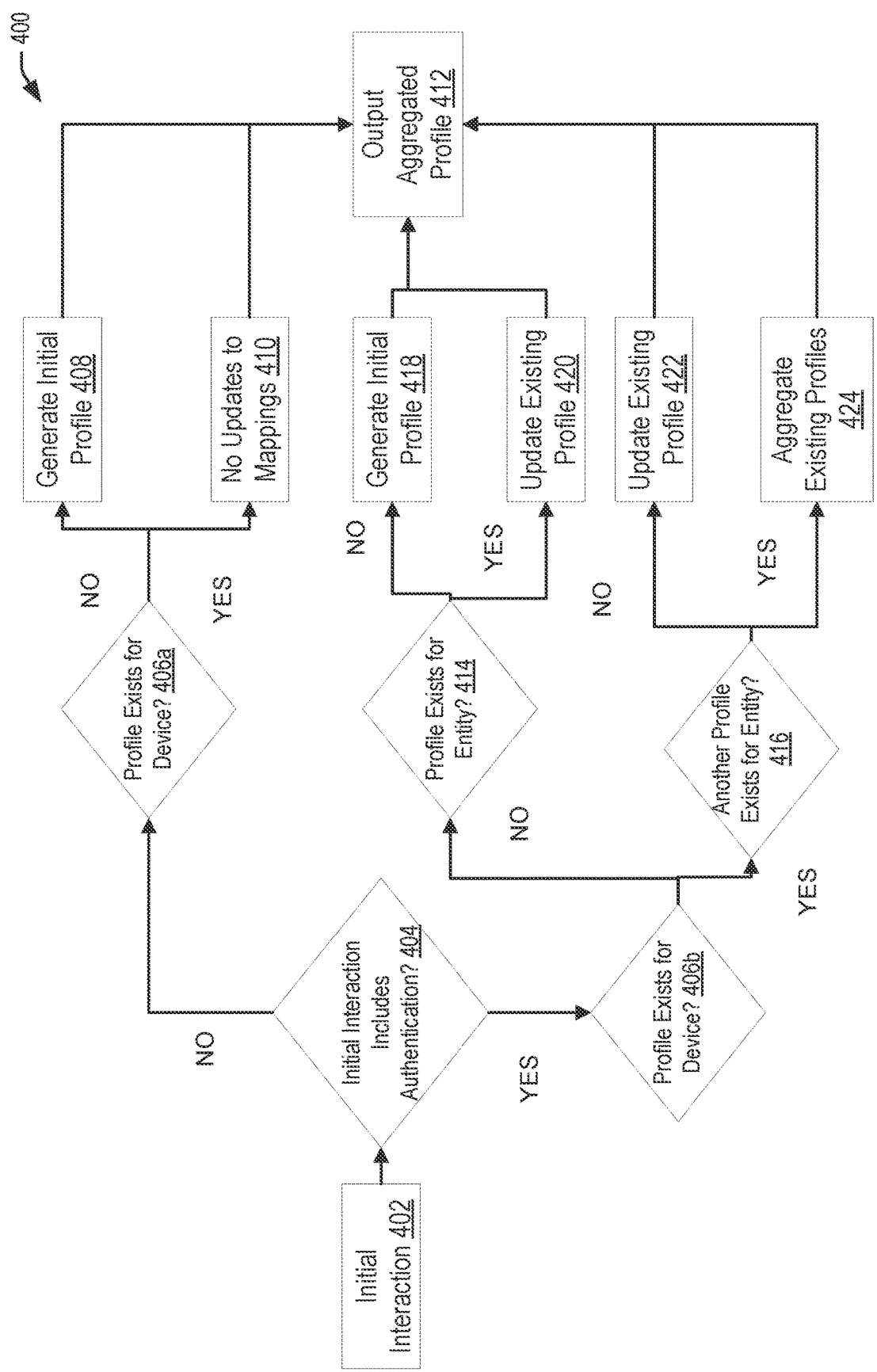
FIG. 4 illustrates an example of a decision flow for generating an aggregated profile for an entity in accordance with at least one embodiment.

FIG. 4 illustrates an example of a decision flow 400 for generating an aggregated profile for an entity in accordance with at least one embodiment. The decision flow 400 may begin at initial interaction 402. The initial interaction 402 may involve a target entity and a provider entity. The target entity may transmit, for example using a first computing device, a request to the provider entity, for example received at a second computing device. At decision point 404, the second computing device may determine whether the initial interaction 402 includes authentication information or data. Authentication information or data may include a username/password combination, biometric data, multi-factor authentication data, other personally identifiable information, or any other suitable information or data that may be used to determine whether a request is authentic or legitimate. If the second computing device determines that the initial interaction 402 does not include authentication information or data, the second computing device may proceed to decision point 406*a*, and if the second computing device determines that the initial interaction 402 does include authentication information or data, the second computing device may proceed to decision point 406*b*.

At the decision point 406*a* and at the decision point 406*b*, the second computing device may determine whether a profile exists for a device used to engage in the initial interaction 402. For example, the second computing device may query a data repository that includes existing profiles using a device identification associated with the first computing device. In some embodiments, the second computing device may execute a profile identification service, such as the profile identification service 132, to generate and submit the query for potentially identifying the existing profile. At the decision point 406*a*, and if the second computing device determines that a profile does not exist for the device, then the second computing device may proceed to action 408 in which the second computing device generates an initial profile for target entity. The initial profile may include data received from the device for initializing the initial interaction 402. For example, the initial profile may include the device identification and may be subsequently populated with interaction data from the initial interaction 402. At the decision point 406*a*, and if the second computing device determines that a profile does exist for the device, then the second computing device may proceed to action 410 in which the second computing device determines to not update mappings associated with the existing profile. In some embodiments, the action 410 may involve updating data included in the existing profile without altering existing mappings associated with the existing profile or adding new mappings to the existing profile. Subsequent to the action 408 and/or subsequent to the action 410, the second computing device may proceed to action 412 in which the second computing device can execute an aggregation service, such as the aggregation service 134, to generate and/or output an aggregated profile. In these examples, the aggregated profile may be the initial profile for the target entity, the existing profile for the target entity, etc.

At the decision point 406*b*, and if the second computing device determines that a profile does not exist for the device, then the second computing device may proceed to decision point 414 in which the second computing device determines whether a profile exists for the target entity based at least in part on the authentication data received with the initial interaction 402. At the decision point 406*b*, and if the second computing device determines that a profile does exist for the device, then the second computing device may proceed to decision point 416 in which the second computing device determines whether any other profile exists for the target entity based at least in part on the authentication data received with the initial interaction 402. At the decision point 414, and if the second computing device determines that no profile exists for the entity, the second computing device may proceed to action 418 in which the second computing device generates an initial profile for target entity. The initial profile may include data received from the device for initializing the initial interaction 402. For example, the initial profile may include the device identification, the authentication information, and may be subsequently populated with interaction data from the initial interaction 402. At the decision point 414, and if the second computing device determines that one or more profiles do exist for the target entity, the second computing device may proceed to action 420 in which the second computing device updates the one or more existing profiles with the device identification, the authentication information, and the like. Subsequent to the action 418 and/or subsequent to the action 420, the second computing device may proceed to action 412 in which the second computing device outputs an aggregated profile. In these examples, the aggregated profile may be the initial profile for the target entity, the updated existing profile for the target entity, etc.

At the decision point 416, and if the second computing device determines that no other profile exists for the entity, the second computing device may proceed to action 422 in which the second computing device updates the one or more existing profiles with the device identification, the authentication information, and the like. At the decision point 416, and if the second computing device determines that one or more other profiles exist for the entity, the second computing device may proceed to action 424 in which the second computing device aggregates the one or more existing profiles together to generate an aggregated profile for the target entity. Subsequent to the action 422 and/or subsequent to the action 424, the second computing device may proceed to action 412 in which the second computing device outputs an aggregated profile. In these examples, the aggregated profile may be the updated existing profile for the target entity, the aggregation of the one or more existing profiles for the target entity, etc.

Figure 5:
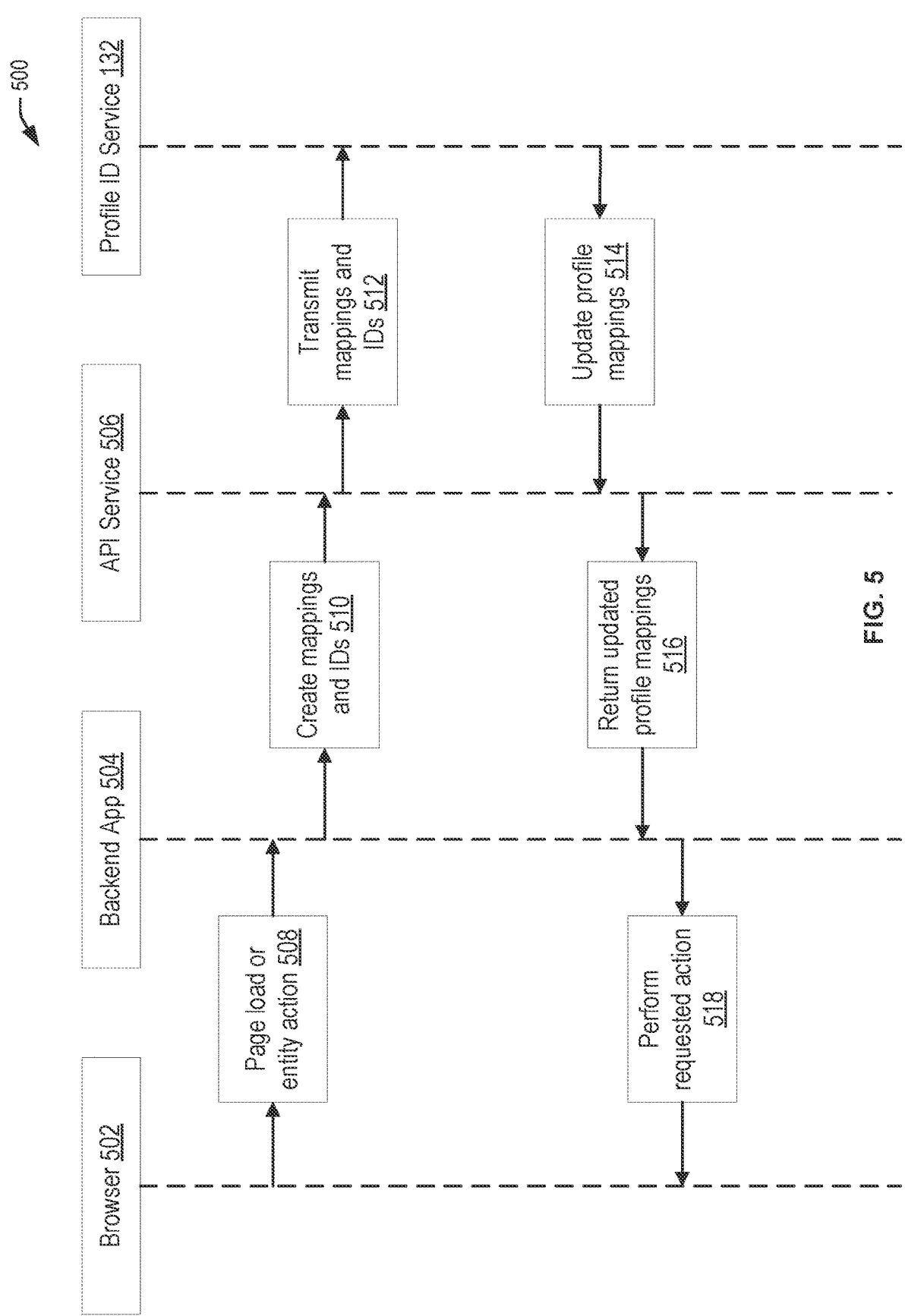
FIG. 5 illustrates an example of a swim-lane diagram for generating and/or managing an aggregated profile for an entity in accordance with at least one embodiment.

FIG. 5 illustrates an example of a swim-lane diagram 500 for generating and/or managing an aggregated profile for an entity in accordance with at least one embodiment. The swim-lane diagram 500 may involve a browser 502, a backend application 504, an API service 506, such as the API service 124 or the API service 140, and the profile identification service 132, though other suitable features or components may also be involved with the swim-lane diagram 500. The swim-lane diagram 500 may begin at action 508 in which an action is requested to be performed by an entity, which may be or include a target entity. At the action 508, the target entity may use a client computing device, for example via the browser 502, to access a webpage, to request a webpage display a particular user interface or subpage, or to request any other suitable action be performed by a computing device that is configured to provide the webpage. The computing device may receive the request via the browser 502 and may transmit the request to the backend application 504. At action 510, the backend application 504, which may include and/or may execute a profile identification service, may create mappings, receive identification indicators, and the like and may transmit the foregoing to the API service 506. The backend application 504 may create mappings between authentication data, identification indicators, and the like included in the request and one or more existing profiles. In some embodiments, the backend application 504 may generate an initial profile for the target entity based at least in part on the received request. The API service 506 may receive the mappings, the identification indicators, the initial profile or existing profiles, and the like, and, at action 512, the API service 506 can transmit the foregoing to the profile identification service 132.

The profile identification service 132 can use the initial profile, the one or more existing profile, the identification indicators, and any other suitable received information to generate updated profile mappings for the target entity or for an existing profile associated with the target entity. In some embodiments, the profile identification service 132 may include and/or execute a mapping service, such as the mapping service 312, to generate the updated profile mappings. At action 514, the profile identification service 132 can transmit the updated profile mappings to the API service 506, which, at action 516, can return the updated profile mappings to the backend application 504. In some embodiments, the backend application 504 can be, can include, or can otherwise access a content recommendation engine that can be used to recommend content for the target entity based at least in part on the updated profile mappings. At action 518, the backend application 504 can perform the requested action and can provide an output to the browser 502. For example, the backend application 504 can provide a requested webpage via the browser 502. In some embodiments, the backend application 504 can embed the content recommendation in the webpage provided to the target entity via the browser 502. In other embodiments, the backend application 504 can provide the content recommendation prior to performing a requested action received by the client computing device.

Figure 6:
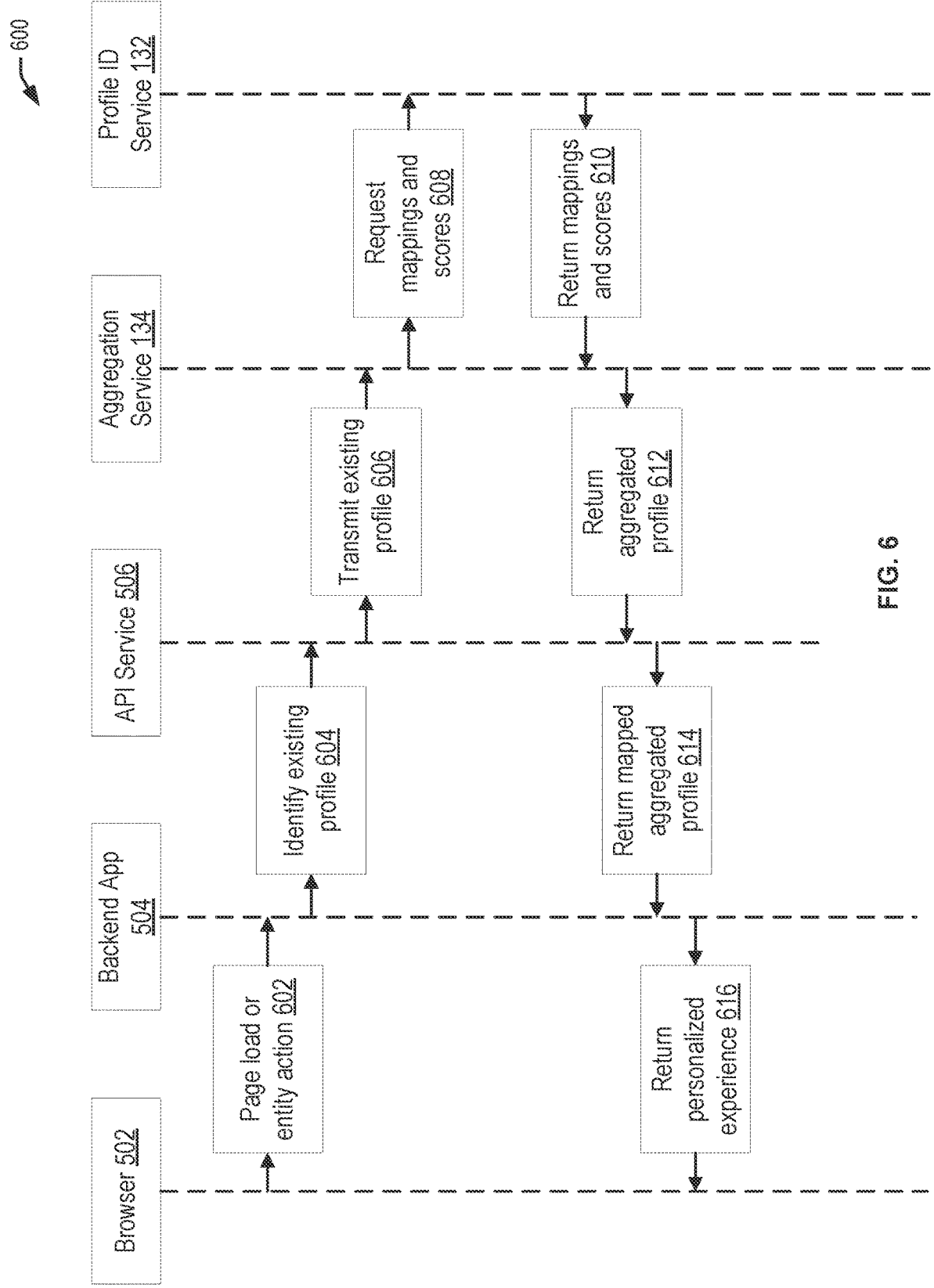
FIG. 6 illustrates an example of a swim-lane diagram for providing a content recommendation based at least in part on an aggregated profile for an entity in accordance with at least one embodiment.

FIG. 6 illustrates an example of a swim-lane diagram 600 for providing a content recommendation based at least in part on an aggregated profile for an entity in accordance with at least one embodiment. The swim-lane diagram 600 may involve a browser 502, a backend application 504, an API service 506, such as the API service 124 or the API service 140, an aggregation service 134, though other suitable features or components may also be involved with the swim-lane diagram 600, and the profile identification service 132. The swim-lane diagram 600 may begin at action 602 in which an action is requested to be performed by an entity, which may be or include a target entity. At the action 602, the target entity may use a client computing device, for example via the browser 502, to access a webpage, to request a webpage display a particular user interface or subpage, or to request any other suitable action be performed by a computing device that is configured to provide the webpage. The computing device may receive the request via the browser 502 and may transmit the request to the backend application 504. At action 604, the backend application 504 may identify one or more existing profiles for the entity, for example using the request transmitted to the computing device at the action 602. In some embodiments, the backend application 504 may use a device identification, authentication information, and the like to identify the one or more existing profiles for the entity. The backend application 504 can provide the one or more existing profiles to the API service 506, and at action 606, the API service 506 can transmit the one or more existing profiles to the aggregation service 134.

At action 608, the aggregation service 134 can request mappings and scores from the profile identification service 132. For example, the aggregation service 134 can transmit the one or more existing profiles, or any subset of the data included therein, to the profile identification service 132 with a request to cause the profile identification service 132 to perform one or more mapping operations and/or one or more scoring operations. For example, the profile identification service 132 can map identification indicators included in the one or more existing profiles to one or more target entities, to one or more different identification indicators, and the like. In some embodiments, the mappings may associate one or more target entities, or one or more identification indicators associated therewith, with the one or more existing profiles or any subset of data included therein. In some embodiments, the one or more scoring operations may include operations that can be performed by a machine-learning model. For example, the profile identification service 132 can input the one or more existing profiles, or any data included therein, into a machine-learning model that may be configured to output indications of similarity. In a particular example, the machine-learning model may be configured to output a likelihood of one or more target entities being associated with the one or more existing profiles based at least in part on data (e.g., identification indicators, historical interaction data, and the like) included in the one or more existing profiles. At action 610, the profile identification service 132 can return the mappings and/or the scores to the aggregation service 134.

The aggregation service 134 can receive the mappings and/or the scores, and the aggregation service 134 can generate the aggregated profile 210. In some embodiments, the aggregation service 134 can use the mappings and/or the scores to identify multiple existing profiles associated with the target entity, and the aggregation service 134 can aggregate the multiple existing profiles into the aggregated profile 210. In other embodiments, the aggregation service 134 can generate a new profile as the aggregated profile 210 and populate the new profile with a combination of de-duplicated data from the multiple existing profiles. In yet other embodiments, the aggregation service 134 can be generated by the profile identification service 132 and transmitted to the aggregation service 134 with the mappings and/or the scores at the action 610. At action 612, the aggregation service 134 returns the aggregated profile 210 to the API service 506, which, at action 614, can return a mapped aggregated profile to the backend application 504. The mapped aggregated profile can include the aggregated profile 210 that is mapped to the target entity. The backend application 504 can use the mapped aggregated profile to generate a personalized experience for the target entity. For example, the backend application 504 can generate a personalized webpage for display via the browser 502. The personalized webpage may include one or more content recommendations for the target entity. In some embodiments, the backend application 504 can adjust a style, a content, and the like associated with the personalized webpage based at least in part on the mapped aggregated profile. At action 616, the backend application 504 can return the personalized experience to the browser 502 to provide the personalized experience to the target entity.

Figure 7:
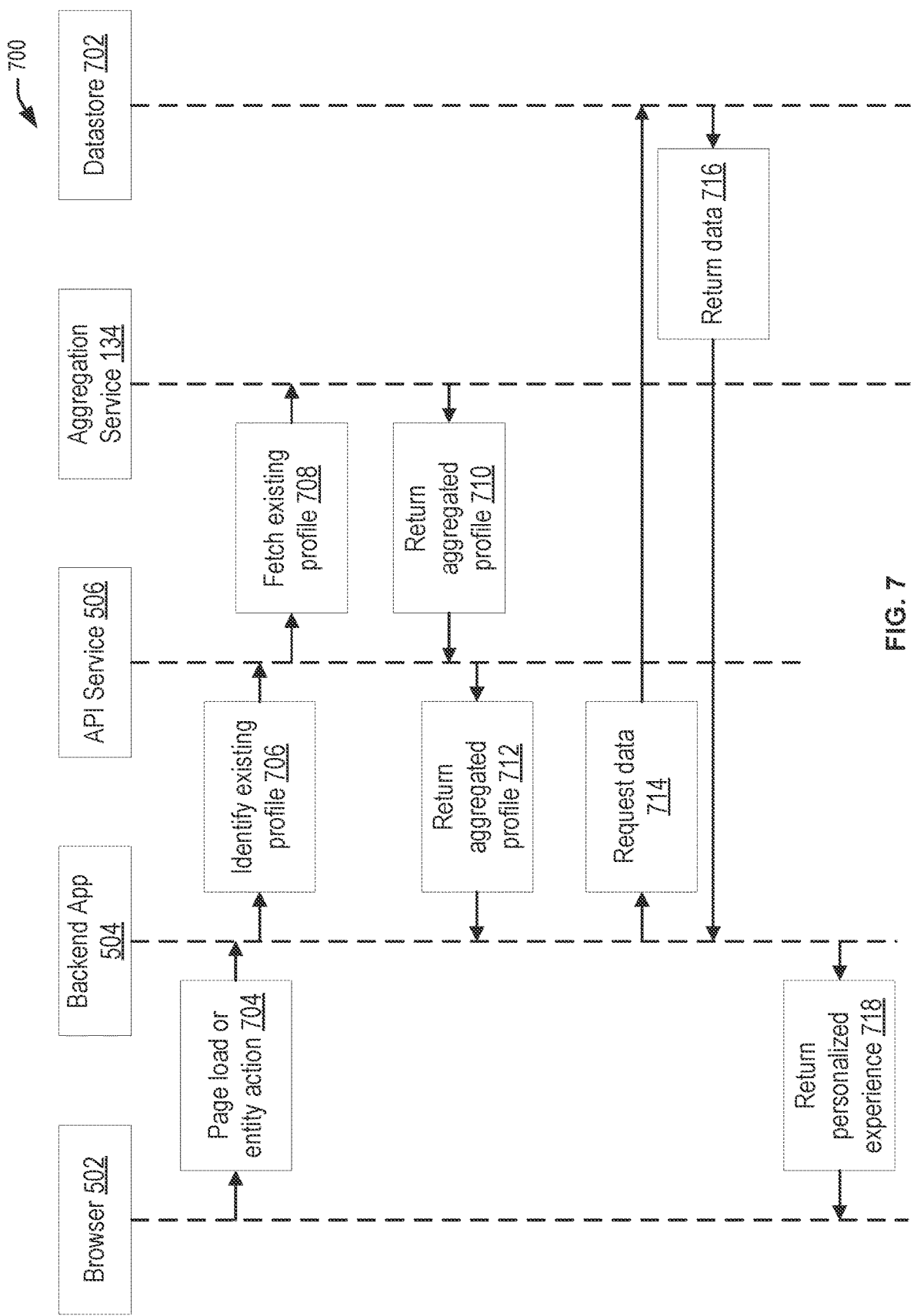
FIG. 7 illustrates another example of a swim-lane diagram for providing a content recommendation based at least in part on an aggregated profile for an entity in accordance with at least one embodiment.

FIG. 7 illustrates another example of a swim-lane diagram 700 for providing a content recommendation based at least in part on an aggregated profile for an entity in accordance with at least one embodiment. The swim-lane diagram 700 may involve a browser 502, a backend application 504, an API service 506, such as the API service 124 or the API service 140, the aggregation service 134, and a datastore 702, though other suitable features or components may also be involved with the swim-lane diagram 700. The swim-lane diagram 700 may begin at action 704 in which an action is requested to be performed by an entity, which may be or include a target entity. At the action 704, the target entity may use a client computing device, for example via the browser 502, to access a webpage, to request a webpage display a particular user interface or subpage, or to request any other suitable action be performed by a computing device that is configured to provide the webpage. The computing device may receive the request via the browser 502 and may transmit the request to the backend application 504. At action 706, the backend application 504 may identify one or more existing profiles for the entity, for example using the request transmitted to the computing device at the action 704. In some embodiments, the backend application 504 may use a device identification, authentication information, and the like to identify the one or more existing profiles for the entity. The backend application 504 can provide the one or more existing profiles to the API service 506, and at action 708, the API service 506 can fetch or otherwise receive the one or more existing profiles to the aggregation service 134.

The aggregation service 134 can use the one or more existing profiles to generate one or more mappings, generate an aggregated profile, such as the aggregated profile 210, for the target entity, and the like. The aggregation service 134 can aggregate multiple existing profiles for the target entity into a single profile as the aggregated profile. In other examples, the aggregation service 134 can augment an existing profile for the target entity with additional, de-duplicated data from a different existing profile, with additional, de-duplicated data from the request initially transmitted to the computing device, and the like to generate the aggregated profile. At action 710, the aggregation service 134 can transmit the aggregated profile to the API service 506, which, at action 712, can return the aggregated profile to the backend application 504.

The backend application 504 can receive the aggregated profile and can generate a query for information based at least in part on the aggregated profile. For example, the backend application 504 can generate a query for recommended content based at least in part on the aggregated profile. In a particular example, the backend application 504 can generate a query for recommended content and transmit the query to the datastore 702, which may be, may include, and/or may be communicatively coupled with a content recommendation engine. In other embodiments, the backend application 504 may receive recommended content for the target entity based on the aggregated profile and may transmit a query to the datastore 702 to receive data, recommended content, and the like from the datastore 702 for providing to the target entity. At action 714, the backend application 504 can transmit any or all of the foregoing queries to the datastore 702, and, at action 716, the datastore 702 can return the request data to the backend application 504. The backend application 504 can use the returned data to generate a personalized experience for the target entity. For example, the backend application 504 can generate a personalized webpage for display via the browser 502. The personalized webpage may include one or more content recommendations for the target entity. In some embodiments, the backend application 504 can adjust a style, a content, and the like associated with the personalized webpage based at least in part on the mapped aggregated profile. At action 718, the backend application 504 can return the personalized experience to the browser 502 to provide the personalized experience to the target entity.

Figure 8:
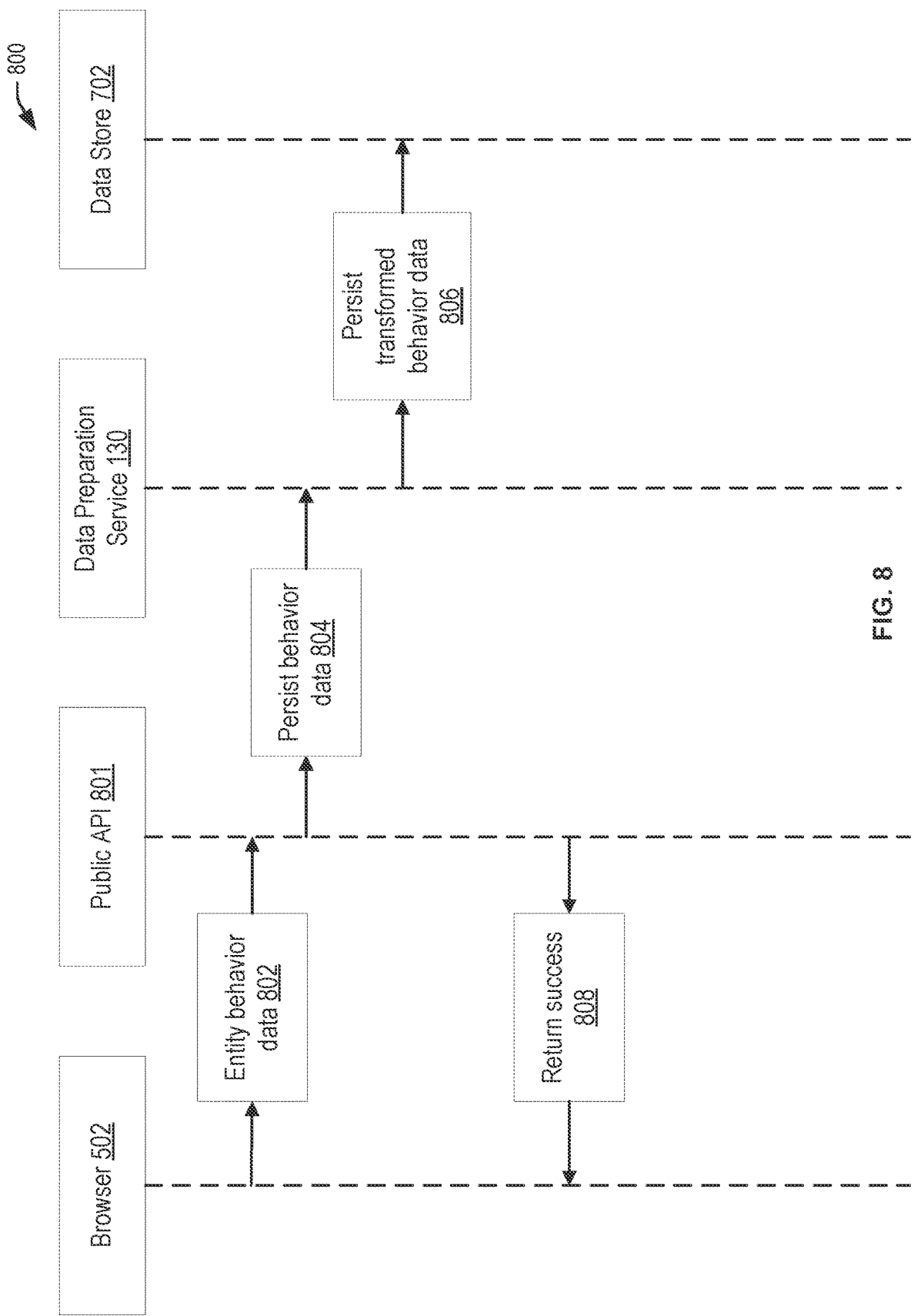
FIG. 8 illustrates an example of a swim-lane diagram for generating behavior data for an entity for use in generating an aggregated profile in accordance with at least one embodiment.

FIG. 8 illustrates an example of a swim-lane diagram 800 for generating behavior data for an entity for use in generating an aggregated profile in accordance with at least one embodiment. The swim-lane diagram 800 may involve a browser 502, a public API 801, the data preparation service 130, and the data store 702, though other suitable features or components may also be involved with the swim-lane diagram 800. The swim-lane diagram 800 may begin at action 802 in which a target entity uses a client computing device to perform an interaction with an online computing environment provided by a computing device owned, managed, or otherwise controlled by a provider entity. The interaction may involve the client computing device transmitting authentication data, device identification data, and other suitable data for initiating the interaction to the computing device via the browser 502. The browser 502 can receive interaction data from the interaction and may cause behavior data relating to the target entity to be gathered or otherwise received. The behavior data may include data about how the target entity interacts with the browser 502, a type of interaction initiated by the target entity, historical interactions with which the target entity is involved, and the like. At the action 802, the browser 502 may transmit the entity behavior data to the public API 801, which may be communicatively coupled with the data preparation service 130.

In some embodiments, the public API 801 may receive the entity behavior data and may augment the entity behavior data with additional data or may otherwise transmit the entity behavior data to the data preparation service 130. In a particular example, the public API 801 may make an API call to one or more separate computing devices, may generate and submit a query to one or more data repositories, or the like for receiving additional entity behavior data. The additional entity behavior data may include historical interaction data involving the target entity, may include one or more likelihoods relating to the target entity output by one or more machine-learning models, and the like. At action 804, the public API 801 may persist, for example as an asynchronous task and in response to receiving appropriate permissions, the entity behavior data to the data preparation service 130. The data preparation service 130 may enrich the persisted entity behavior data or may otherwise perform one or more other data preparation operations on the persisted entity behavior data. For example, the data preparation service 130 may transform the persisted entity data into a different format, a different configuration, or the like to generate transformed entity behavior data.

At action 806, the data preparation service 130 persists the transformed entity behavior data to the data store 702. In some embodiments, the data preparation service 130 can persist the transformed entity behavior data to the aggregation service 134, which can aggregate the persisted entity behavior data with other suitable data, such as one or more existing profiles, authentication data, device identification data, and the like to generate an aggregated profile. At action 808, and in response to the data store 702 and/or the aggregation service 134 successfully receiving the persisted, transformed, entity behavior data, the public API 801 may return a success message to the browser 502. In some embodiments, the success message may not be displayed on the browser. Additionally or alternatively, the success message may cause the browser 502 to terminate data collection operations, to commence different data collection operations, or to perform other suitable operations.

Figure 9:
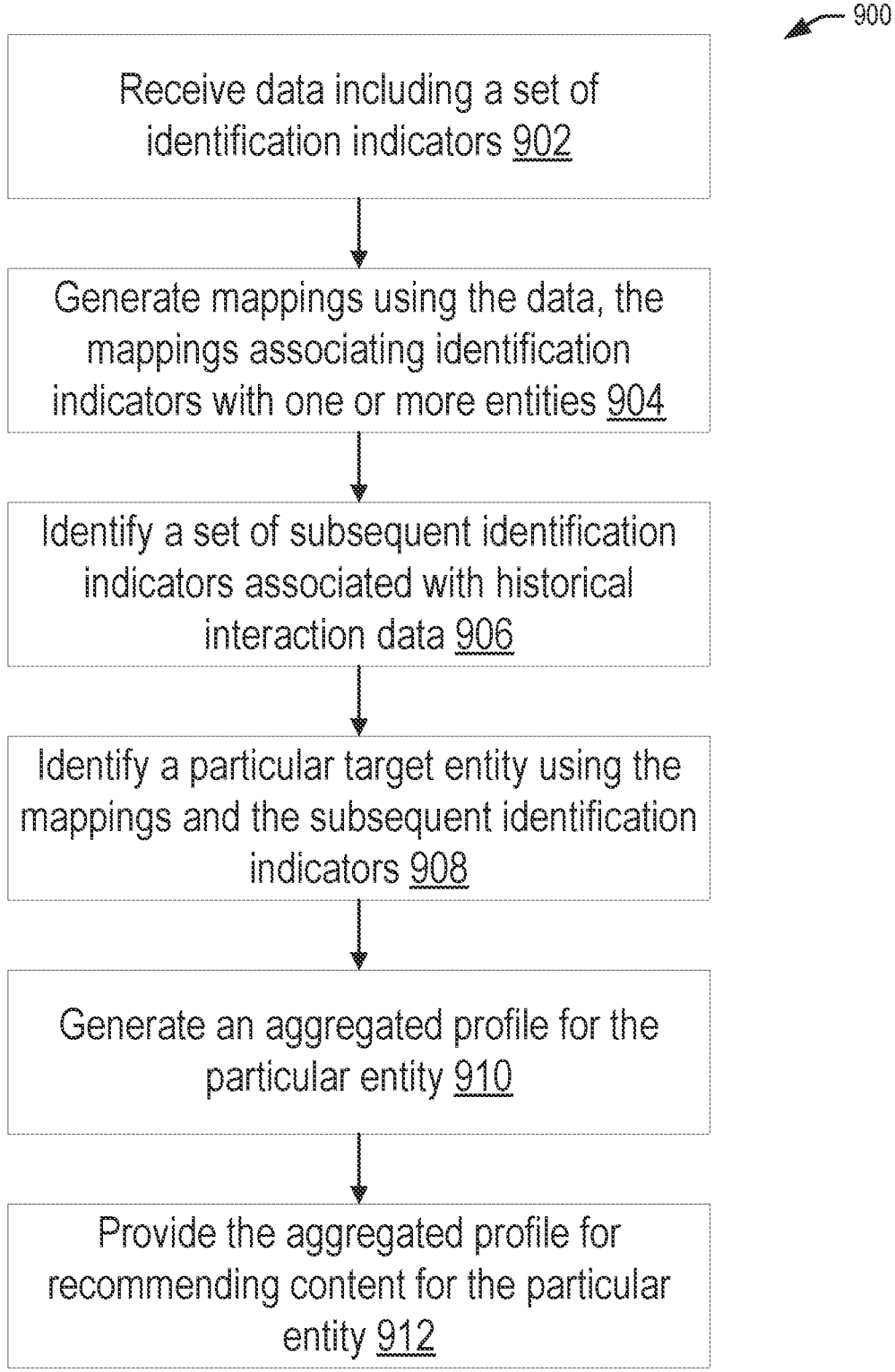
FIG. 9 illustrates a flowchart of a process for providing a content recommendation to an entity based at least in part on an aggregated profile for the entity in accordance with at least one embodiment.

FIG. 9 illustrates a flowchart of a process 900 for providing a content recommendation to an entity based at least in part on an aggregated profile for the entity in accordance with at least one embodiment. Some or all of the process 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the process 900, or any operation associated therewith, may be performed by the profile identification service 132, the aggregation service 134, other suitable service, or any combination thereof. Additionally or alternatively, while the operations of the process 900 are described in a particular order, the operations are not limited to this order and may be performed in any other suitable order including at least partially asynchronously or in parallel. Additionally or alternatively, the operations described with respect to the process 900, or any subset thereof, may be or include an iterative process. For example, an aggregated profile may initially be generated for an entity, and a computing device may iteratively follow one or more operations of the process 900 to continuously, periodically, or on-demand update the aggregated profile.

At block 902, a computing device receives data including a set of identification indicators. The computing device may be owned, managed, or otherwise controlled by a provider entity that may provide goods or services such as online computing resources, advertising services, and the like. The computing device may receive the data from an interaction initiated by a target entity such as a using entity that may use the goods or services provided by the provider entity. In some embodiments, the computing device may access a set of separate computing devices or data stores to receive the data. For example, the computing device may make one or more API calls to each of two or more separate computing devices that may not be in communication with one another, that may store data differently than one another, or the like. The computing device may receive the data from the two or more separate computing devices, and the data may include the identification indicators. In some embodiments, the identification indicators may include personally identifiable information, such as a name, a physical address, a digital address, and the like, may include device-specific information, such as a device serial number, may include network-specific information, such as an IP address, and the like. Additionally or alternatively, the identification indicators may include identification indicators for one or more target entities.

At block 904, the computing device generates mappings using the data. In some embodiments, the computing device may execute or otherwise use a profile identification service, such as the profile identification service 132, to generate the mappings. Each mapping of the generated mappings may associate a different identification indicator of the identification indicators with a different target entity of the one or more target entities. In some embodiments, the mappings may or may not represent a one-to-one correspondence between the identification indicators and the one or more target entities. For example, multiple different identification indicators may be mapped to the same target entity, a single identification indicator may be mapped to multiple target entities, or a combination thereof.

At block 906, the computing device identifies a set of subsequent identification indicators. The computing device may access or otherwise receive historical interaction data. For example, the computing device may include a data store on which historical interaction data is stored, and the computing device can access the historical interaction data from the data store. In other examples, the computing device may make an API call or other suitable call to a separate computing device or to a separate data store to request and/or receive the historical interaction data. The requested and/or received historical interaction data may involve the one or more target entities, and the requested and/or received historical interaction data may include the subsequent identification indicators that includes identification indicators corresponding to the one or more target entities. In some embodiments, a subset of the subsequent identification indicators of the historical interaction data may match a subset of the identification indicators received by the computing device, for example at the block 902.

At block 908, the computing device identifies a particular target entity from among the one or more target entities. The computing device may use the mappings, the subsequent identification indicators, and/or any other suitable information to identify the particular target entity. For example, the computing device may identify the particular target entity as the entity of the one or more target entity that is associated with the highest number of identification indicators and with the highest number of subsequent identification indicators. In another example, such as an example in which the computing device receives an initial interactions from an entity, the computing device can use the mappings and the subsequent identification indicators to determine that the entity is the particular target entity. Additionally or alternatively, the computing device may input the mappings and/or the subsequent identification indicators into one or more machine-learning models to receive a likelihood that the particular target entity is associated with at least a subset of the mappings and/or at least a subset of the subsequent identification indicators. The computing device may otherwise suitably use the mappings and the subsequent identification indicators to identify the particular target entity.

At block 910, the computing device generates an aggregated profile, such as the aggregated profile 210, for the particular target entity. The computing device may identify one or more existing profiles for the particular target entity. For example, the computing device may use, such as via the aggregation service 134, the mappings, the subsequent identification indicators, one or more device indicators, and the like to identify any existing profiles that may be associated with the particular target entity. For example, the particular target entity may have used different subsequent identification indicators to engage in historical interactions, and the computing device, or other suitable computing device, may have generated profiles for identification indicators provided by the particular target entity without associating the profiles directly with the particular target entity. The computing device can identify each existing profile for the particular entity and can aggregate the existing profiles into the aggregated profile using the aggregation service 134 or other suitable service. In some embodiments, aggregating the existing profiles may include mapping the existing profiles to one another, may involve generating a new profile (e.g., the aggregated profile) that includes de-duplicated data from a combination of the existing profiles, and the like.

At block 912, the computing device provides the aggregated profile for recommending content to the particular target entity. Recommending content may include recommending advertising tools or products for the particular target entity to use, recommending online computing resources for the particular target entity to acquire, and the like. Providing the aggregated profile may include storing the aggregated profile in a data store that can be accessed by a separate computing device that may be configured to use the aggregated profile to recommend the content. In other examples, the computing device may provide the aggregated profile by transmitting the aggregated profile to the separate computing device to facilitate the content recommendations for the particular target entity. In some embodiments, the computing device may automatically use the aggregated profile to generate and output the content recommendation. For example, the computing device can generate the aggregated profile, and the computing device can use the aggregated profile to generate the content recommendations, which may include additional computing resources, etc., and provide, such as via a graphical user interface, or other suitable means for providing content recommendations, the content recommendations to the particular target entity.

Figure 10:
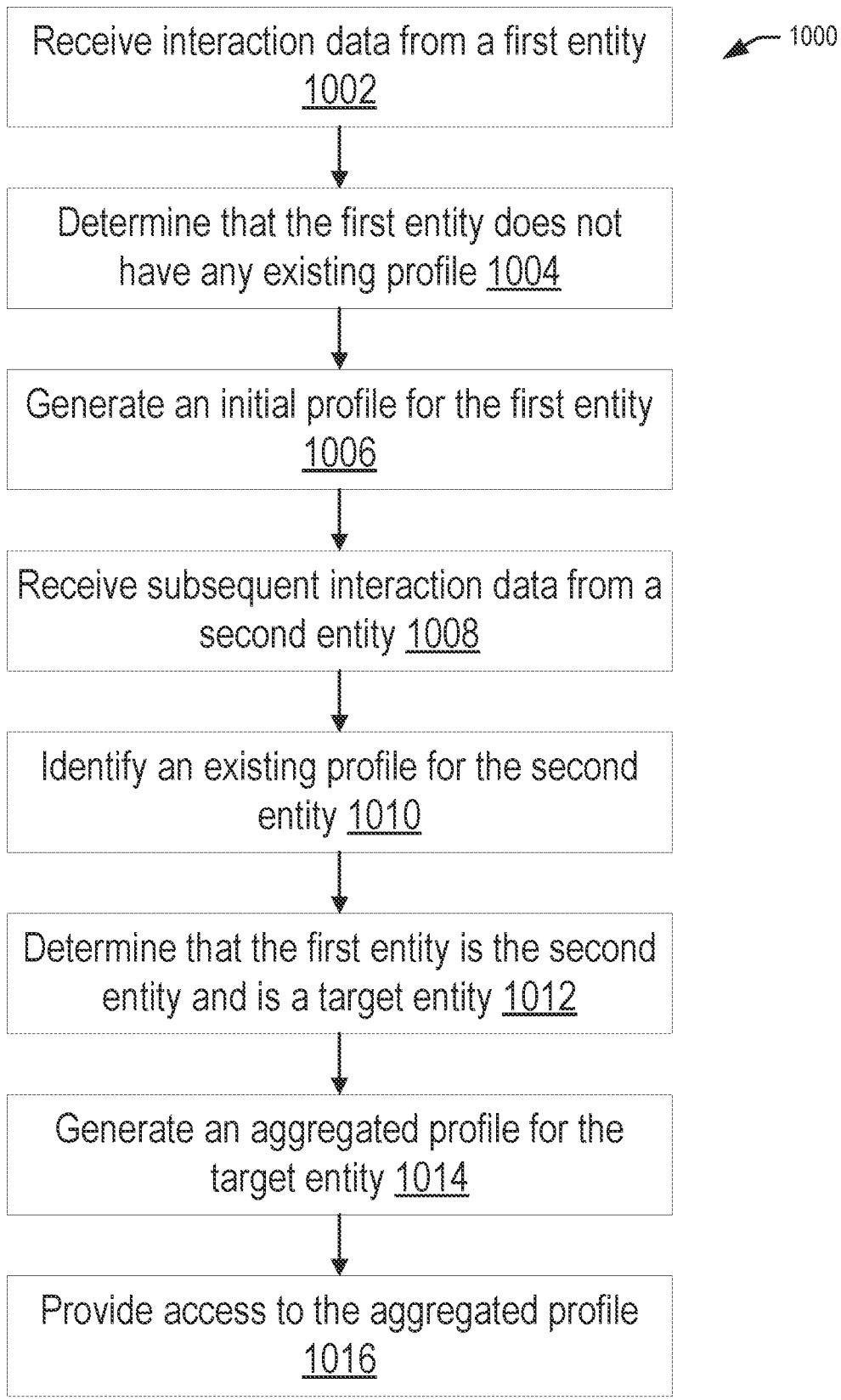
FIG. 10 illustrates a flowchart of a process for providing access to an aggregated profile for an entity in accordance with at least one embodiment.

FIG. 10 illustrates a flowchart of a process 1000 for providing access to an aggregated profile for an entity in accordance with at least one embodiment. Some or all of the process 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the process 1000, or any operation associated therewith, may be performed by the profile identification service 132, the aggregation service 134, other suitable service, or any combination thereof. Additionally or alternatively, while the operations of the process 1000 are described in a particular order, the operations are not limited to this order and may be performed in any other suitable order including at least partially asynchronously or in parallel. Additionally or alternatively, the operations described with respect to the process 1000, or any subset thereof, may be or include an iterative process. For example, an aggregated profile may initially be generated for an entity, and a computing device may iteratively follow one or more operations of the process 1000 to continuously, periodically, or on-demand update the aggregated profile.

At block 1002, a computing device receives interaction data from a first entity. The first entity may use a client computing device or other suitable computing device and may use the client computing device to transmit a request to initiate an interaction to the computing device, which may be owned, managed, or otherwise controlled by a provider entity that may provide good or services such as online computing resources. The computing device may receive the request and may parse the request to receive the interaction data. In some embodiments, the interaction data may include a device identification for the client computing device, but the interaction data may lack authentication data such as identification indicators. For example, the interaction data may include a request to access an interactive computing environment provided by the computing device but may not include a username/password combination, biometric data, or any other authentication data. In some embodiments, the interaction data may include authentication data, and the computing device may be configured to identify the first entity based at least in part on the interaction data.

At block 1004, the computing device determines that the first entity does not have an existing profile. The computing device may use the interaction data to determine that the first entity does not have an existing profile. For example, the computing device may use the device identification included in the interaction data to query a data store that includes existing profiles. The query may return no results, and, as such, the computing device may determine that the first entity does not have an existing profile. Additionally or alternatively, if the interaction data includes any authentication data, the computing device can use the authentication data to search for existing profiles. In examples in which queries using the device identification and/or the authentication data return no results, the computing device can determine that the first entity does not have an existing profile.

At block 1006, the computing device generates an initial profile for the first entity. The computing device can populate the initial profile with data at least from the interaction data. For example, the initial profile can be populated by the computing device with the device identification and with any interactions performed or requested to be initiated by the first entity on the interactive computing environment. Additionally or alternatively, the computing device can populate the initial profile for the first entity with any authentication data or identification data received via the interaction data. The computing device may use the initial profile to recommend content for the first entity, may provide the initial profile for a separate computing device to use, may store the initial profile in a data repository that can be accessed by the computing device or a separate computing device at a future time, or any combination thereof.

At block 1008, the computing device receives subsequent interaction data associated with a second entity. The second entity may be similar or identical to the first entity, or the second entity may be different than the first entity. The second entity may use a client computing device to request an interaction to be initiated with respect to the interactive computing environment provided by the computing device. For example, the second entity may input authentication data, such as a username/password combination, biometric data, and the like into the client computing device, which can transmit the authentication data to the computing device. The computing device may receive the authentication data along with the request to initiate the interaction, and the computing device can parse the authentication data and/or the request to receive the subsequent interaction data. In some embodiments, the subsequent interaction data may include a device identification for the client computing device, the authentication data, and any other suitable data that can be included in the subsequent interaction data.

At block 1010, the computing device identifies an existing profile for the second entity. The computing device can use the subsequent interaction data to generate and submit one or more queries for identifying the existing profile for the second entity. For example, the computing device can use the device identification, the authentication data, and the like to generate and submit the one or more queries. The computing device can transmit the one or more queries to one or more data stores accessible to the computing device, one or more separate computing devices communicatively coupled with the computing device, and the like. In some embodiments, a query including the device identification may return an existing profile for the second entity. In other embodiments, a query including the authentication data may return one or more existing profiles for the second entity that include at least indications of the authentication data.

At block 1012, the computing device determines that the second entity is the first entity and is a target entity. The computing device can use the existing profile to determine that the second entity is the same entity as the first entity. For example, the computing device can compare the existing profile to the initial profile and may determine that at least a subset of data included in the existing profile is the same or similar to at least a subset of data included in the initial profile. In a particular example, the computing device may determine that the device identification associated with the interaction data is the same as the device identification associated with the subsequent interaction data. In some embodiments, the computing device can use the interaction data and the subsequent interaction data to determine that the second entity is the same entity as the first entity. For example, the computing device can determine that types of data included in the interaction data and the subsequent interaction data are the same or similar, can determine that metadata corresponding to the interaction data and the subsequent interaction data are the same or similar, and the like, and the computing device can, based on the foregoing, determine that the second entity is the same entity and the first entity and is the target entity. At block 1014, the computing device generates an aggregated profile, such as the aggregated profile 210, for the target entity. The computing device can aggregate the initial profile and the existing profile to generate the aggregated profile. For example, the computing device can augment the existing profile, or any data included therein, with the initial profile or any data included therein. In another example, the computing device can generate the aggregated profile as a separate profile and populate the separate profile with a de-duplicated combination of data included in the initial profile and in the existing profile. In some embodiments, the aggregated profile may represent disparate identification indicators, disparate historical interactions and data associated therewith, and the like about the target entity.

At block 1016, the computing device provides access to the aggregated profile. The computing device can store the aggregated profile in a data store communicatively coupled with the computing device. The data store may be a publicly available data store, or may be a restricted data store that is accessible to one or more computing devices in response to the one or more computing devices being authenticated. In some embodiments, the computing device may transmit the aggregated profile to a separate computing device, a machine-learning model, a computer service, or to other suitable devices, models, or services that can use the aggregated profile as an input. In yet other embodiments, the computing device may automatically use the aggregated profile to generate outputs such as one or more content recommendations for the target entity.

Figure 11:
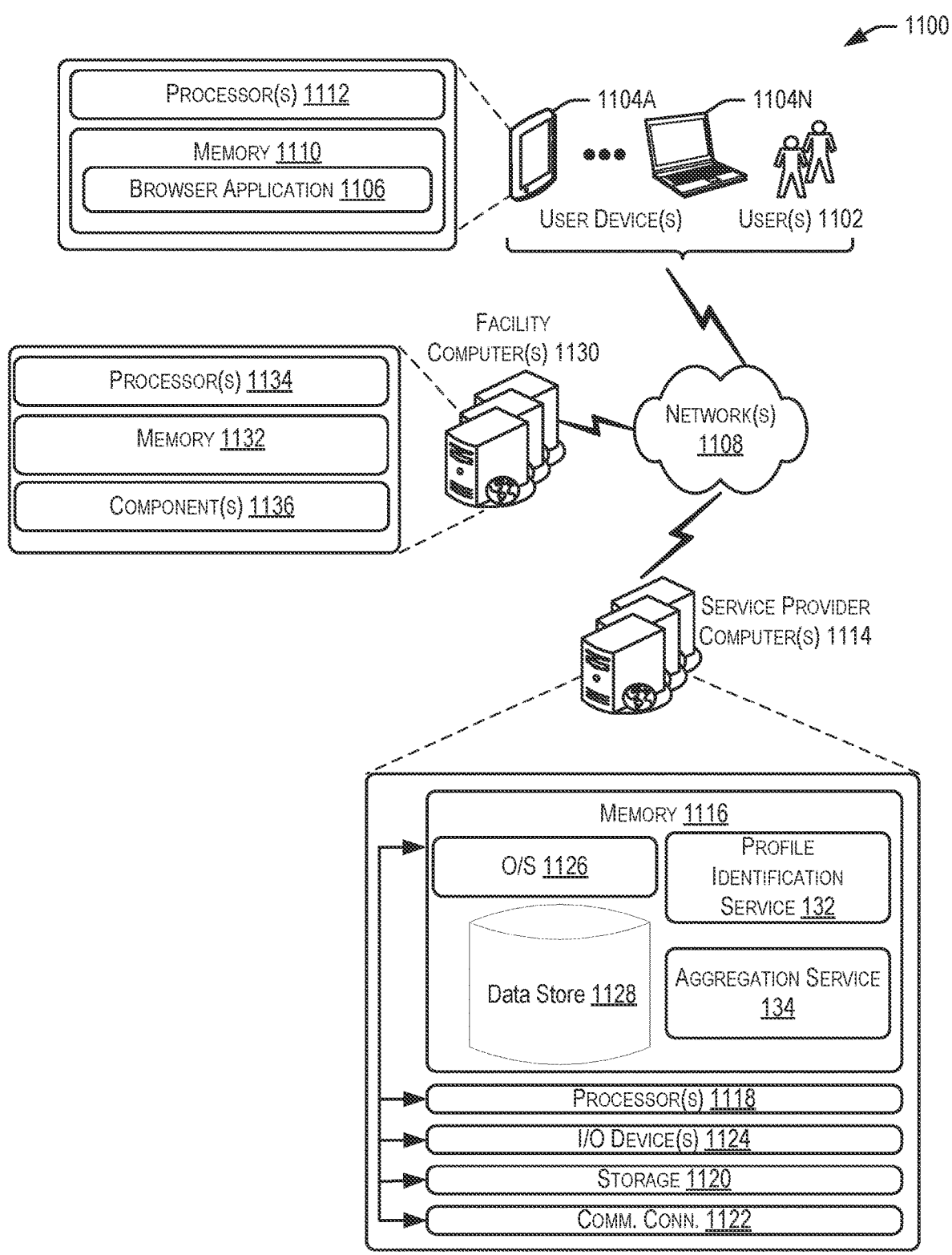
FIG. 11 illustrates an example architecture for a profile identification service and/or an aggregation service that includes one or more service provider computers, a user device, and one or more facility computers in accordance with at least one embodiment.

FIG. 11 illustrates an example of an architecture 1100 for a profile identification service, such as the profile identification service 132, and/or an aggregation service, such as the aggregation service 134, that includes one or more service provider computers, a user device, and one or more facility computers in accordance with at least one embodiment. In the architecture 1100, one or more users 1102, such as contributing entities, combination entities, using entities, and the like, may utilize user computing devices 1104A-N (collectively, the user devices 1104) to access a browser application 1106 or a user interface (UI) that can be accessed through the browser application 1106 and via one or more networks 1108, to receive text data, image data, video data, or the like, which may be presented and interacted with via browser application 1106 or the UI accessible through the browser application 1106. The browser application 1106 can be or include any browser control or native application that can access and/or display a network page or other information. A native application may include an application or program that has been developed for use on a particular platform, such as an operating system, or a particular device such as a particular type of mobile device.

In accordance with at least one embodiment, the user devices 1104 may be configured for communicating with service provider computers 1114 and facility computers 1130 via networks 1108. The user devices 1104 may include at least one memory, such as memory 1110, and one or more processing units or one or more processors 1112. The memory 1110 may store program instructions that are loadable and executable on the one or more processors 1112, as well as data generated during the execution of these programs. Depending on the configuration and type of the user devices 1104, the memory 1110 may be volatile, such as random access memory (RAM), and/or non-volatile such as read-only memory (ROM), flash memory, etc. The user devices 1104 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the user devices 1104. In some implementations, the memory 1110 may include multiple different types of memory, such as static random access memory (SRAM), dynamic random access memory (DRAM), ROM, etc.

Turning to the contents of the memory 1110 in more detail, the memory 1110 may include an operating system and one or more application programs or services for implementing the features disclosed herein. Additionally or alternatively, the memory 1110 may include one or more services for implementing the features described herein such as the profile identification service 132 and/or the aggregation service 134.

The architecture 1100 may additionally include one or more service provider computers 1114 that may, in some examples, provide computing resources such as, but not limited to, client entities, low latency data storage, durable data storage, data access, management, virtualization, hosted computing environment or "cloud-based" solutions, profile identification feature implementation, etc. The service provider computers 1114 may implement or be an example of one or more machine-learning models or one or more service provider computers (e.g., the computing devices) described herein, for example, with reference to FIGS. 1-10 and/or throughout the disclosure. The one or more service provider computers 1114 may also be operable to provide site hosting, computer application development, and/or implementation platforms, combinations of the foregoing, or the like to the one or more users 1102 via user devices 1104.

In some examples, the networks 1108 may include any one or a combination of many different types of networks, such as cable networks, the Internet, wireless networks, cellular networks, and other private and/or public networks. While the illustrated examples represent the users 1102 communicating with the service provider computers 1114 over the networks 1108, the described techniques may equally apply in instances where the users 1102 interact with the one or more service provider computers 1114 via the one or more user devices 1104 over a landline phone, via a kiosk, or in any other manner. It is also noted that the described techniques may apply in other client/server arrangements, such as set-top boxes, etc., as well as in non-client/server arrangements such as locally stored applications, peer-to-peer arrangements, etc. In some embodiments, the users 1102 may communicate with the facility computers 1130 via networks 1108, and the facility computers 1130 may communicate with the service provider computers 1114 via networks 1108. In some embodiments, the service provider computers 1114 may communicate, via networks 1108, with one or more third party computers (not illustrated) to obtain data inputs for the various algorithms of the generation features described herein. In accordance with at least one embodiment, the service provider computers 1114 may receive text data, video data, image data, one or more scores, or the like for at least generating an aggregated profile for a particular target entity.

The one or more service provider computers 1114 may be or include any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 1114 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or a distributed computing environment. In some examples, the one or more service provider computers 1114 may be in communication with the user device 1104 via the networks 1108, or via other network connections. The one or more service provider computers 1114 may include one or more servers, which may be arranged in a cluster or as individual servers not associated with one another. In embodiments, the service provider computers 1114 may be in communication with one or more third party computers (not illustrated) via networks 1108 to receive or to otherwise obtain data including text data, video data, image data, one or more scores, or the like for at least generating the aggregated profile for the particular target entity.

In one illustrative configuration, the one or more service provider computers 1114 may include at least one memory, such as memory 1116, and one or more processing units or one or more processors 1118. The one or more processors 1118 may be implemented as appropriate in hardware, computer-executable instructions, firmware, or any combination thereof. Computer-executable instruction or firmware implementations of the one or more processors 1118 may include computer-executable or machine-executable instructions written in any suitable programming language to perform the various functions described when executed by a hardware computing device such as a processor. The memory 1116 may store program instructions that are loadable and executable on the one or more processors 1118, as well as data generated during the execution of these programs. Depending on the configuration and type of the one or more service provider computers 1114, the memory 1116 may be volatile, such as RAM, and/or non-volatile such as ROM, flash memory, etc. The one or more service provider computers 1114 or servers may also include additional storage 1120, which may include removable storage and/or non-removable storage. The additional storage 1120 may include, but is not limited to, magnetic storage, optical disks and/or tape storage. The disk drives and their associated computer-readable media may provide non-volatile storage of computer-readable instructions, data structures, program services, and other data for the computing devices. In some implementations, the memory 1116 may include multiple different types of memory, such as SRAM, DRAM, ROM, etc.

The memory 1116, the additional storage 1120, removable and/or non-removable, may be examples of non-transitory computer-readable storage media. For example, computer-readable storage media may include volatile or non-volatile, removable or non-removable media implemented in any method or technology for storage of information such as computer-readable instructions, data structures, program services, or other data. The memory 1116 and the additional storage 1120 may be examples of non-transitory computer storage media. Additional types of non-transitory computer storage media that may be present in the one or more service provider computers 1114 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 1114. Combinations of any of the above should also be included within the scope of non-transitory computer-readable media.

The one or more service provider computers 1114 may also include one or more communication connection interfaces 1122 that can allow the one or more service provider computers 1114 to communicate with a data store, another computing device or server, user terminals, and/or other devices on the networks 1108. The one or more service provider computers 1114 may also include one or more I/O devices 1124, such as a keyboard, a mouse, a pen, a voice input device, a touch input device, a display, speakers, a printer, etc.

Turning to the contents of the memory 1116 in more detail, the memory 1116 may include an operating system 1126, one or more data stores 1128, and/or one or more application programs or services for implementing the features disclosed herein including the profile identification service 132 and/or the aggregation service 134. The architecture 1100 may include facility computers 1130. In some embodiments, the service provider computers 1114, the profile identification service 132, and/or the aggregation service 134 may be configured to generate and transmit instructions, via networks 1108, to components 1136 in communication or otherwise associated with facility computers 1130. For example, the instructions may be configured to activate or otherwise trigger the components 1136 for aggregating one or more existing profiles for a particular target entity into the aggregated profile 210 as determined by the profile identification service 132 and/or the aggregation service 134. The facility computers 1130 may include at least one memory, such as memory 1132, and one or more processing units or one or more processors 1134. The memory 1132 may store program instructions, which may include one or more machine-learning models, one or more computer services, and the like as disclosed herein, that can be loaded and executed on the one or more processors 1134, as well as data generated during the execution of these programs. Depending on the configuration and type of the facility computers 1130, the memory 1132 may be volatile, such as random access memory (RAM), and/or non-volatile such as read-only memory (ROM), flash memory, etc. The facility computers 1130 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the facility computers 1130. In some implementations, the memory 1132 may include multiple different types of memory, such as static random access memory (SRAM), dynamic random access memory (DRAM), ROM, etc.

Turning to the contents of the memory 1132 in more detail, the memory 1132 may include an operating system and one or more application programs or services for implementing the features disclosed herein. Additionally, the memory 1132 may include one or more services for implementing the features described herein including the profile identification service 132, the aggregation service 134, and the like. In some embodiments, the service provider computers 1114 and the profile identification service 132 and/or the aggregation service 134 may generate the aggregated profile 210 based at least in part on data received from multiple different data sources. The user device 1104 and the browser application 1106 may be configured to transmit the output to the user 1102 or to otherwise facilitate access of the output by the user 1102.

The profile identification service 132 and/or the aggregation service 134 may be configured to generate and transmit a user interface or data objects for updating a user interface presented via browser application 1106 and user device 1104 for presenting the aggregated profile 210, or any data included therein or inferences determined therefrom, or otherwise associated therewith to the user 1102. Other graphical updates, feedback mechanisms, and data object generation associated with the profile identification features described herein may be implemented by the service provider computers 1114, the profile identification service 132 and/or the aggregation service 134.

Figure 12:
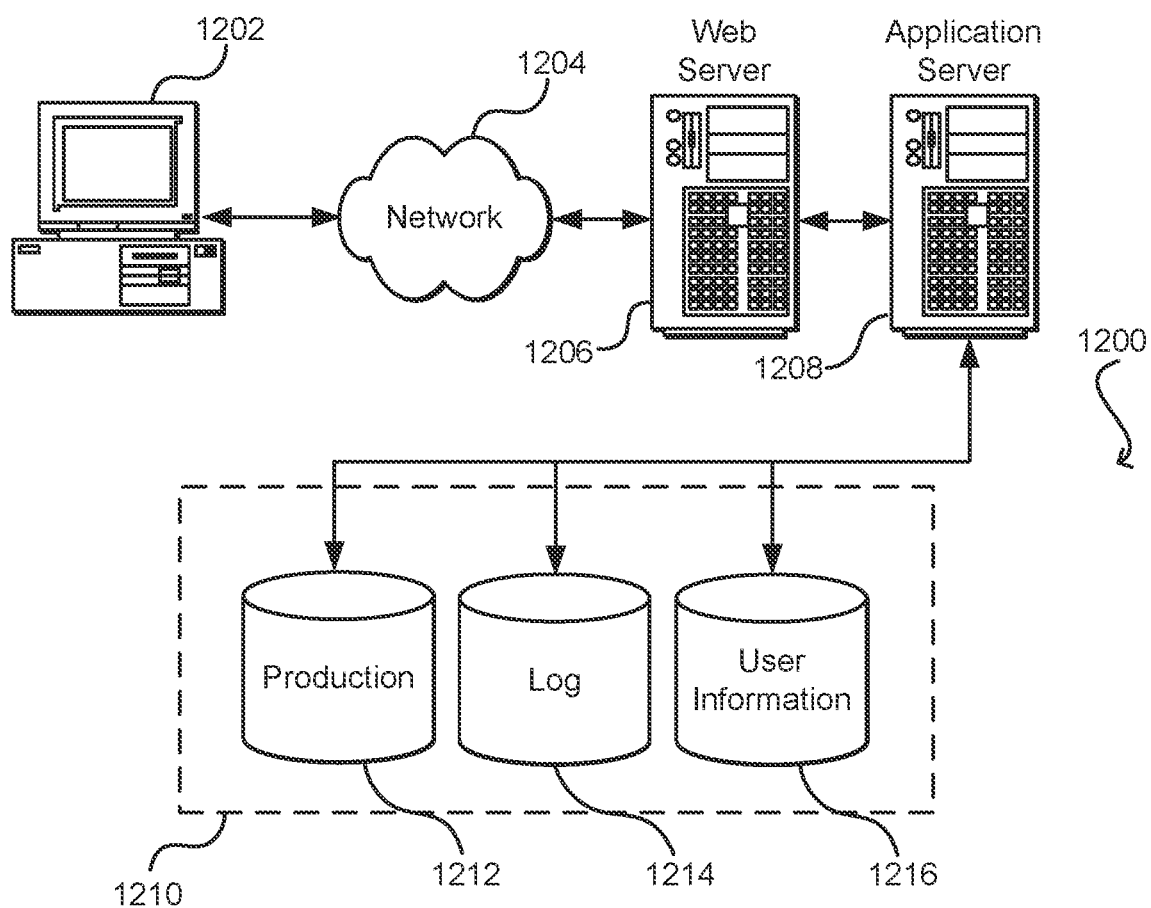
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing device, data from a plurality of data sources, the data comprising a plurality of identification indicators for one or more target entities;
   generating, by a profile identification service of the computing device, a plurality of mappings using the data, individual mappings of the plurality of mappings associating a different identification indicator of the plurality of identification indicators with one or more entities of the one or more target entities, a first mapping of the plurality of mappings associating a device identification with a first entity of the one or more entities, a second mapping of the plurality of mappings associating a set of authentication data with a second entity of the one or more entities, the device identification and the set of authentication data associated with different historical interactions of a plurality of historical interaction;
   identifying, by the profile identification service and based at least in part on the plurality of mappings, a plurality of subsequent identification indicators for the one or more target entities, the plurality of subsequent identification indicators representing the plurality of historical interactions associated with the one or more target entities;
   identifying, by the profile identification service and based at least in part on the plurality of mappings and the plurality of subsequent identification indicators, a particular target entity of the one or more target entities;
   determining, based at least in part on the first mapping and the second mapping, that the first entity is a same entity as the second entity and that the particular target entity is a same target entity as the first entity and the second entity;
   generating, by an aggregation service of the computing device, an aggregated profile for the particular target entity based at least in part on the plurality of mappings and the plurality of subsequent identification indicators; and
   providing one or more content recommendations for the particular target entity based at least in part on the aggregated profile.

2. The computer-implemented method of claim 1, wherein receiving the data comprises receiving an interaction from an unauthenticated entity, and wherein identifying the particular target entity comprises determining that the unauthenticated entity is the particular target entity.

3. The computer-implemented method of claim 1, further comprising:
- receiving an interaction from an unauthenticated entity;
- determining, based at least in part on the interaction, a first device identification for the unauthenticated entity;
- receiving a subsequent interaction from an authenticated entity that involves the authenticated entity providing authentication information; and
- determining, based at least in part on the subsequent interaction, a second device identification for the authenticated entity.

4. The computer-implemented method of claim 3, further comprising:
- generating an initial profile for unauthenticated entity, the initial profile comprising the first device identification;
- identifying an existing profile for the authenticated entity based at least in part on the second device identification;
- determining that the first device identification is the same as the second device identification; and
- generating the aggregated profile by aggregating the initial profile and the existing profile.

5. A non-transitory computer-readable medium comprising instructions that are executable by a processing device for causing the processing device to perform operations comprising:
- receiving, by a computing device, data from one or more data sources, the data comprising one or more identification indicators for one or more target entities;
- mapping, by a profile identification service and utilizing a plurality of mappings, individual identification indicators of the one or more identification indicators to one or more entities of the one or more target entities, a first mapping of the plurality of mappings associating a device identification with a first entity of the one or more entities, a second mapping of the plurality of mappings associating a set of authentication data with a second entity of the one or more entities, the device identification and the set of authentication data associated with different historical interactions of a plurality of historical interaction;
- identifying, by the profile identification service and based at least in part on the mappings, one or more historical interactions associated with the one or more target entities;
- identifying, by the profile identification service and based at least in part on the mappings and the one or more historical interactions, a particular target entity of the one or more target entities;
- determining, based at least in part on the first mapping and the second mapping, that the first entity is the same as the second entity and that the particular target entity is the same as the first entity and the second entity;
- generating, by an aggregation service of the computing device, an aggregated profile for the particular target entity based at least in part on the mappings and the one or more historical interactions; and
- providing access to the aggregated profile.

6. The non-transitory computer-readable medium of claim 5, wherein the one or more data sources comprises a first data source that is disparate with respect to a second data source, wherein the first data source is configured to store interaction data in a first configuration, and wherein the second data source is configured to store interaction data in a second configuration that is different than the first configuration.

7. The non-transitory computer-readable medium of claim 6, wherein the one or more identification indicators comprises a first type of identification indicator and a second type of identification indicator, wherein the first type of identification indicator is a device identification associated with a device used to perform a first historical interaction, and wherein the second type of identification indicator is a set of authentication data provided to initiate a second historical interaction.

8. The non-transitory computer-readable medium of claim 7, wherein mapping individual identification indicators of the one or more identification indicators to the one or more entities comprises:
- determining that the set of authentication data includes the device identification;
- determining that a first entity associated with the device identification is the same as a second entity associated with the set of authentication data; and
- mapping the first type of identification indicator to the second type of identification indicator.

9. The non-transitory computer-readable medium of claim 8, wherein the first type of identification indicator is not associated with an existing profile, and wherein the operations further comprise generating a new profile associated with the first type of identification indicator.

10. The non-transitory computer-readable medium of claim 9, wherein the second type of identification indicator is associated with an existing profile for the second entity, and wherein generating the aggregated profile for the particular target entity comprises aggregating the new profile with the aggregated profile in response to receiving the set of authentication data.

11. The non-transitory computer-readable medium of claim 5, wherein receiving the data comprises receiving an interaction from an unauthenticated entity, and wherein identifying the particular target entity comprises determining that the unauthenticated entity is the particular target entity.

12. The non-transitory computer-readable medium of claim 5, wherein the operations further comprise:
- receiving an interaction from an unauthenticated entity;
- determining, based at least in part on the interaction, a first device identification for the unauthenticated entity;
- receiving a subsequent interaction from an authenticated entity that involves the authenticated entity providing authentication information; and
- determining, based at least in part on the subsequent interaction, a second device identification for the authenticated entity.

13. The non-transitory computer-readable medium of claim 5, wherein the operation of identifying the one or more historical interactions associated with the one or more target entities comprises executing a trained machine-learning model to determine a likelihood that the particular target entity was involved in at least a subset of the one or more historical interactions, and wherein the operation of generating the aggregated profile for the particular target entity comprises using the likelihood from the trained machine-learning model to generate the aggregated profile.

14. The non-transitory computer-readable medium of claim 5, wherein the operation of receiving the data from the one or more data sources comprises receiving the data substantially contemporaneous with respect to the data being generated by the one or more data sources.

15. A computer system comprising:
- a memory configured to store computer-executable instructions; and a processor in communication with the memory and configured to execute the computer-executable instructions to perform operations comprising:

receiving an interaction from a first entity, the interaction including a request for one or more resources, and the interaction including a device identification for a device used for performing the interaction;

generating an initial profile for the first entity that associates the interaction with the first entity based at least in part on a first mapping between the device identification and the first entity;

receiving a subsequent interaction from a second entity, the subsequent interaction including authentication data;

identifying, based at least in part on the authentication data, an existing profile for the second entity based at least in part on a second mapping between the authentication data and the second entity;

determining, based at least in part on the interaction, the subsequent interaction, the first mapping, and the second mapping, that the first entity is the same as the second entity and that the first entity is a target entity;

generating an aggregated profile for the target entity by aggregating the initial profile and the existing profile; and providing access to the aggregated profile.

16. The computer system of claim 15, wherein the operation of providing access to the aggregated profile comprises providing one or more content recommendations to the target entity.

17. The computer system of claim 15, wherein the operations of (i) receiving the interaction from the first entity, (ii) determining that the first entity does not have the existing profile, and (iii) generating the initial profile for the first entity are performable substantially contemporaneously with respect to one another.

18. The computer system of claim 15, wherein the operations further comprise:

identifying the one or more historical interactions associated with the first entity and the second entity; and executing a trained machine-learning model to determine, based at least in part on the one or more historical interactions, a likelihood that the first entity is the same as the second entity.

19. The computer system of claim 18, wherein the operation of generating the aggregated profile for the target entity comprises using the likelihood from the trained machine-learning model to generate the aggregated profile.

20. The computer system of claim 15, wherein a first record of the interaction is stored in a first data source, wherein a second record of the subsequent interaction is stored in a second data source that is disparate with respect to the first data source, and wherein determining that the first entity is the same as the second entity comprises accessing the first data source and the second data source to compare the first record and the second record.

* * * * *